US011361028B2

(12) United States Patent
Li et al.

(10) Patent No.: US 11,361,028 B2
(45) Date of Patent: Jun. 14, 2022

(54) GENERATING A GRAPH DATA STRUCTURE THAT IDENTIFIES RELATIONSHIPS AMONG TOPICS EXPRESSED IN WEB DOCUMENTS

(71) Applicant: Microsoft Technology Licensing, LLC, Redmond, WA (US)

(72) Inventors: Ziliu Li, Sammamish, WA (US); Junaid Ahmed, Bellevue, WA (US); Arnold Overwijk, Redmond, WA (US); Li Xiong, Kirkland, WA (US); Xiao Liu, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 101 days.

(21) Appl. No.: 16/896,254

(22) Filed: Jun. 9, 2020

(65) Prior Publication Data

US 2021/0382944 A1    Dec. 9, 2021

(51) Int. Cl.
*G06F 16/901* (2019.01)
*G06N 20/00* (2019.01)
*G06F 16/906* (2019.01)
*G06F 16/93* (2019.01)

(52) U.S. Cl.
CPC ........ *G06F 16/9024* (2019.01); *G06F 16/906* (2019.01); *G06F 16/93* (2019.01); *G06N 20/00* (2019.01)

(58) Field of Classification Search
CPC .... G06F 16/9024; G06F 16/906; G06F 16/93; G06N 20/00
See application file for complete search history.

(56) References Cited

U.S. PATENT DOCUMENTS 10,956,521 B1 * 3/2021 Yu ........................ G06F 16/9024
2009/0094233 A1 * 4/2009 Marvit .................. G06F 16/313
(Continued)

OTHER PUBLICATIONS

PCT Search Report and Written Opinion for PCT/US2021/028293, dated Jul. 30, 2021, 17 pages.
(Continued)

*Primary Examiner* — Irete F Ehichioya
*Assistant Examiner* — Xiaoqin Hu

(57) ABSTRACT

A technique produces a graph data structure based on at least partially unstructured information dispersed over web documents. The technique involves applying a machine-trained model to a set of documents (or, more generally "document units") to identify topics in the documents. The technique then generates count information by counting the occurrences of the single topics and co-occurrences of parings of topics in the documents. The technique generates conditional probability information based on the count information. An instance of conditional probability information describes a probability that a first topic will occur, given an appearance of a second topic, and a probability that the second topic will occur, given an appearance of the first topic. The technique then formulates the conditional probability information in a graph data structure. The technique also provides an application system that utilizes the graph data structure to provide any kind of computer-implemented service to a user.

16 Claims, 9 Drawing Sheets

(56) References Cited

U.S. PATENT DOCUMENTS

2012/0109963 A1* 5/2012 Mizuguchi .............. G06F 16/90
                                                    707/E17.089
2018/0121539 A1* 5/2018 Ciulla ................. G06F 16/3344

OTHER PUBLICATIONS

Camastra, et al., "Machine Learning-Based Web Documents Categorization by Semantic Graphs," available at https://www.researchgate.net/publication/278029875_Machine_Learning-Based_Web_Documents_Categorization_by_Semantic_Graphs, in Advances in Neural Networks: Computational and Theoretical Issues, Smart Innovation, Systems and Technologies, Springer, vol. 37, 2015, 9 pages.
"Webgraph," available at https://en.wikipedia.org/wiki/Webgraph, Wikipedia article, accessed on May 19, 2020, 2 pages.
"PageRank," available at https://en.wikipedia.org/wiki/PageRank, Wikipedia article, accessed on May 31, 2020, 16 pages.
"Conditional probability," available at https://en.wikipedia.org/wiki/Conditional_probability, Wikipedia article, accessed an May 31, 2020, 11 pages.
Xiong, et al., "Open DomainWeb Keyphrase Extraction Beyond Language Modeling," arXiv:1911.02671v1 [cs.CL], Nov. 6, 2019, 10 pages.
Vaswani, et al., "Attention Is All You Need," arXiv:1706.03762v5 [cs.CL], Dec. 6, 2017, 15 pages.
Devlin, et al., "BERT: Pre-training of Deep Bidirectional Transformers for Language Understanding," arXiv:1810.04805v2 [cs CL], May 24, 2019, 16 pages.

* cited by examiner

FIG. 3  FIG. 4  FIG. 5

|  | Topic A | Topic B | Topic C | Topic D | ... |
|---|---|---|---|---|---|
| Topic A | 1533 | 4 | 433 | 54 | |
| Topic B | 407 | 829 | 14 | 116 | |
| Topic C | 302 | 112 | 545 | 64 | |
| Topic D | 824 | 713 | 98 | | |
| ⋮ | | | | | |

COUNT INFORMATION

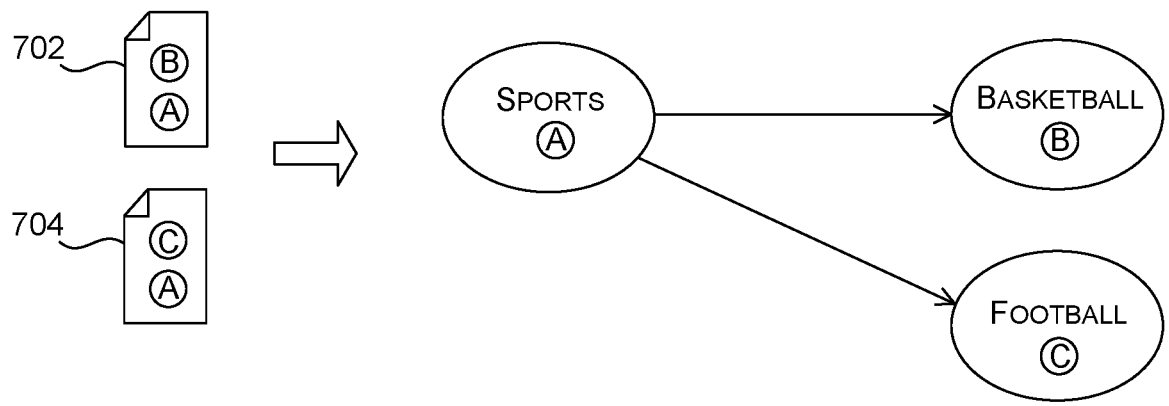

FIG. 7

| Topic A | Topic B | P (B\|A) | P (A\|B) | Relationship Tag |
|---|---|---|---|---|
| ⋮ | | | | |
| orchestral music | singing voice | 0.033884178 | 0.132441922 | NoChild |
| orchestral music | songs | 0.110452429 | 0.008754875 | NoChild |
| orchestral music | symphonies | 0.420191974 | 0.611620031 | BisChildOfA |
| orchestral music | violins | 0.10656402 | 0.69547488 | BisChildOfA |
| orchestral music | Mozart | 0.159463515 | 0.602973098 | BisChildOfA |
| orchids | agriculture | 0.101336552 | 0.000399973 | NoChild |
| orchids | botany | 0.726671807 | 0.004907828 | AisChildOfB |
| orchids | farming | 0.529876849 | 0.00253936 | AisChildOfB |
| orchids | flowers | 0.861114836 | 0.007149653 | AisChildOfB |
| orchids | fruit | 0.278161459 | 0.001076185 | AisChildOfB |
| orchids | gardening | 0.820649502 | 0.004239736 | AisChildOfB |
| orchids | gardens | 0.606113942 | 0.010122201 | AisChildOfB |
| orchids | horticulture | 0.470899826 | 0.008654415 | AisChildOfB |
| orchids | house plants | 0.677679809 | 0.00613316 | AisChildOfB |
| orchids | leaves | 0.163716419 | 0.024203115 | NoChild |
| orchids | photosynthesis | 0.313765589 | 0.016435695 | AisChildOfB |
| orchids | plant identification | 0.36119865 | 0.005695668 | AisChildOfB |
| orchids | plants | 0.803160342 | 0.004487026 | AisChildOfB |
| orchids | seeds | 0.129648876 | 0.002856553 | NoChild |
| orchids | trees | 0.768668142 | 0.003975616 | AisChildOfB |
| ⋮ | | | | |

FIG. 8

PROCESS DIE PRODUCING AN APPLICATION SYSTEM
THAT USES A GRAPH DATA STRUCTURE 1202

APPLY A MACHINE-TRAINED MODEL TO A SET OF DOCUMENT UNITS TO PRODUCE TOPIC INFORMATION, EACH DOCUMENT UNIT INCLUDING AT LEAST A PORTION OF AT LEAST ONE WEB DOCUMENT THAT IS ACCESSIBLE VIA A WIDE AREA NETWORK, THE DOCUMENT UNITS CORRESPONDING TO DIFFERENT DOMAINS. THE OPERATION OF APPLYING INVOLVES PROCESSING TOKENS INCLUDED IN EACH DOCUMENT UNIT TO IDENTIFY ONE OR MORE TOPICS THAT ARE EXPRESSED BY EACH DOCUMENT UNIT, WITHOUT REGARD TO HOW THE ONE OR MORE TOPICS ARE RELATED TO EACH OTHER.
1204

GENERATE COUNT INFORMATION BASED ON THE TOPIC INFORMATION BY:
FOR A SET OF CANDIDATE TOPICS, COUNTING A NUMBER OF TIMES EACH TOPIC IN THE SET OF CANDIDATE TOPICS OCCURS WITHIN THE SET OF DOCUMENT UNITS; AND FOR A PLURALITY OF PAIRINGS OF TOPICS IN THE SET OF CANDIDATE TOPICS, COUNTING A NUMBER OF TIMES EACH PAIRING OF TOPICS OCCURS WITHIN THE SET OF DOCUMENT UNITS.
1206

STORE THE COUNT INFORMATION IN A DATA TABLE.
1208

GENERATE CONDITIONAL PROBABILITY INFORMATION BASED ON THE COUNT INFORMATION, AN INSTANCE OF CONDITIONAL PROBABILITY INFORMATION DESCRIBING A PROBABILITY THAT A FIRST TOPIC WILL APPEAR WITHIN A DOCUMENT UNIT, GIVEN AN ASSUMED APPEARANCE OF A SECOND TOPIC IN THE DOCUMENT UNIT, AND A PROBABILITY THAT THE SECOND TOPIC WILL APPEAR WITHIN THE DOCUMENT UNIT, GIVEN AN ASSUMED APPEARANCE OF THE FIRST TOPIC.
1210

FORMULATE THE CONDITIONAL PROBABILITY INFORMATION IN A GRAPH DATA STRUCTURE, THE GRAPH DATA STRUCTURE INCLUDING A PLURALITY OF NODES AND A PLURALITY OF EDGES, THE PLURALITY OF NODES REPRESENTING THE TOPICS IN THE SET OF CANDIDATE TOPICS, AND EACH EDGE THAT CONNECTS TWO NODES EXPRESSING A HIERARCHICAL RELATIONSHIP BETWEEN TWO TOPICS RESPECTIVELY ASSOCIATED WITH THE TWO NODES.
1302

PROVIDE AN APPLICATION SYSTEM THAT USES THE GRAPH DATA STRUCTURE TO PROVIDE A COMPUTER-IMPLEMENTED SERVICE TO A USER.
1304

FIG. 13

PROCESS FOR USING AN APPLICATION SYSTEM 1402

RECEIVE AN INPUT MESSAGE SUBMITTED BY THE USER VIA A COMPUTER NETWORK.
1404

GENERATE A RESPONSE TO THE INPUT MESSAGE USING AN APPLICATION SYSTEM PROVIDED BY HARDWARE LOGIC CIRCUITRY, THE APPLICATION SYSTEM GENERATING THE RESPONSE BY LEVERAGING INFORMATION PRODUCED BY THE PROCESS 1202 OF FIGS. 12 AND 13.
1406

FIG. 14

DIVIDE A NUMBER OF TIMES THAT THE FIRST TOPIC AND THE SECOND TOPIC CO-OCCUR WITHIN THE DOCUMENT UNITS BY A NUMBER OF TIMES THAT THE SECOND TOPIC OCCURS WITHIN THE DOCUMENT UNITS, TO PRODUCE A FIRST CONDITIONAL PROBABILITY SCORE, AND DIVIDE THE NUMBER OF TIMES THAT THE FIRST TOPIC AND THE SECOND TOPIC CO-OCCUR WITHIN THE DOCUMENT UNITS BY A NUMBER OF TIMES THAT THE FIRST TOPIC OCCURS WITHIN THE DOCUMENT UNITS, TO PRODUCE A SECOND CONDITIONAL PROBABILITY SCORE.
1502

COMPARE EACH OF THE FIRST CONDITIONAL PROBABILITY SCORE AND THE SECOND CONDITIONAL PROBABILITY SCORE TO A PRESCRIBED THRESHOLD VALUE TO PRODUCE A COMPARISON RESULT.
1504

ESTABLISH A LINK BETWEEN THE FIRST TOPIC AND THE SECOND TOPIC BASED ON THE COMPARISON RESULT, THE LINK INDICATING THAT THE SECOND TOPIC IS A CHILD OF THE FIRST TOPIC OR THE FIRST TOPIC IS A CHILD OF THE SECOND TOPIC.
1506

REPRESENT THE LINK AS AN EDGE IN A GRAPH DATA STRUCTURE.
1508

FIG. 15

GENERATING A GRAPH DATA STRUCTURE THAT IDENTIFIES RELATIONSHIPS AMONG TOPICS EXPRESSED IN WEB DOCUMENTS

BACKGROUND

It has been recognized that the World Wide Web contains a wealth of knowledge that can be harvested and applied in various computer applications. However, this knowledge exists in latent and unstructured form, often scattered across web pages that have no formal relation to each other and share no common domain, layout, or informational quality. It is difficult to extract knowledge from these unstructured and varied sources in a reliable and efficient manner.

SUMMARY

A technique produces a graph data structure based on at least partially unstructured information dispersed over web documents. The technique involves applying a machine-trained model to a set of documents (or, more generally "document units") to identify topics in the documents. The technique generates count information by counting the occurrences of single topics and co-occurrences of pairs of topics in the documents. The technique then generates conditional probability information based on the count information. An instance of conditional probability information describes a probability that a first topic will appear within a document, given an assumed appearance of a second topic in the document, and a probability that the second topic will appear given the assumed appearance of the first topic. The technique then formulates the conditional probability information in a graph data structure. The graph data structure includes a plurality of nodes and a plurality of edges. The plurality of nodes represent the topics in the set of candidate topics, and each edge that connects two nodes expresses a hierarchical relationship between two topics respectively associated with the two nodes.

According to another aspect, the technique provides an application system that utilizes the graph data structure to provide any kind of computer-implemented service to a user. Illustrative services include a search service, a recommendation service, etc. For instance, the application system can include logic that interprets an input message submitted by the user by interrogating the graph data structure. Alternatively, or in addition, the application system can include logic that is modified in advance of the user's submission of the input message to incorporate information gleaned from the graph data structure.

Overall, the technique provides a resource-efficient and scalable way of discovering latent information dispersed across web documents. It is efficient because its adopts a streamlined first stage that performs the limited task of determining topics expressed in web documents, without attempting to model the relationships among topics or attempting to account for the widely varying characteristics of different kinds of web documents. It includes an equally streamlined second stage that applies conditional probability analysis to the results of the first stage to identify the relationships among topics discovered in the first stage, without necessarily performing complex semantic analysis on the topics. The technique is scalable because it can be efficiently applied to a large number of web documents; this, in turn, is possible because the technique eliminates the need for a developer to develop and update a complex machine-trained model, and because it eliminates or reduces the need for a human analyst to manually evaluate web documents.

The above factors also allow the technique to consume computing resources (e.g., processing resources, memory resources, and communication resources, etc.) in an efficient manner. For example, since the first stage does not attempt to model the relationship among topics, it foregoes or reduces use of the computing resources that would otherwise be applied to this task.

In the inference stage of use, the application system can be said to make efficient use of computing resources in processing a request by the user. For instance, the application system may correspond to a search engine that allows the user to efficiently find and retrieve a web document, or a filing engine that allows the user to efficiently store a document at an appropriate location in a data store. In some cases, the application system can also be expected to contribute to good user experience, e.g., by reducing an amount of time and labor that are required by the user to complete his or her task objectives, and/or reducing a number of inaccurate responses it provides to the user.

The above-summarized technique can be manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIGS. 3-5 show three respective interpretations of the term "document unit," as it is used in this disclosure.

FIG. 7 shows a simplified example of a technique for calculating conditional probability in the computing environment of FIG. 1.

FIG. 8 shows a sample of a graph data structure produced by the computing environment of FIG. 1, expressed here in table form.

FIGS. 12 and 13 together show one implementation of a process for producing an application system.

FIG. 14 shows a process for applying an application system produced via the process of FIGS. 12 and 13.

FIG. 15 shows further details regarding operations within the process of FIGS. 12 and 13.

Figure 1:
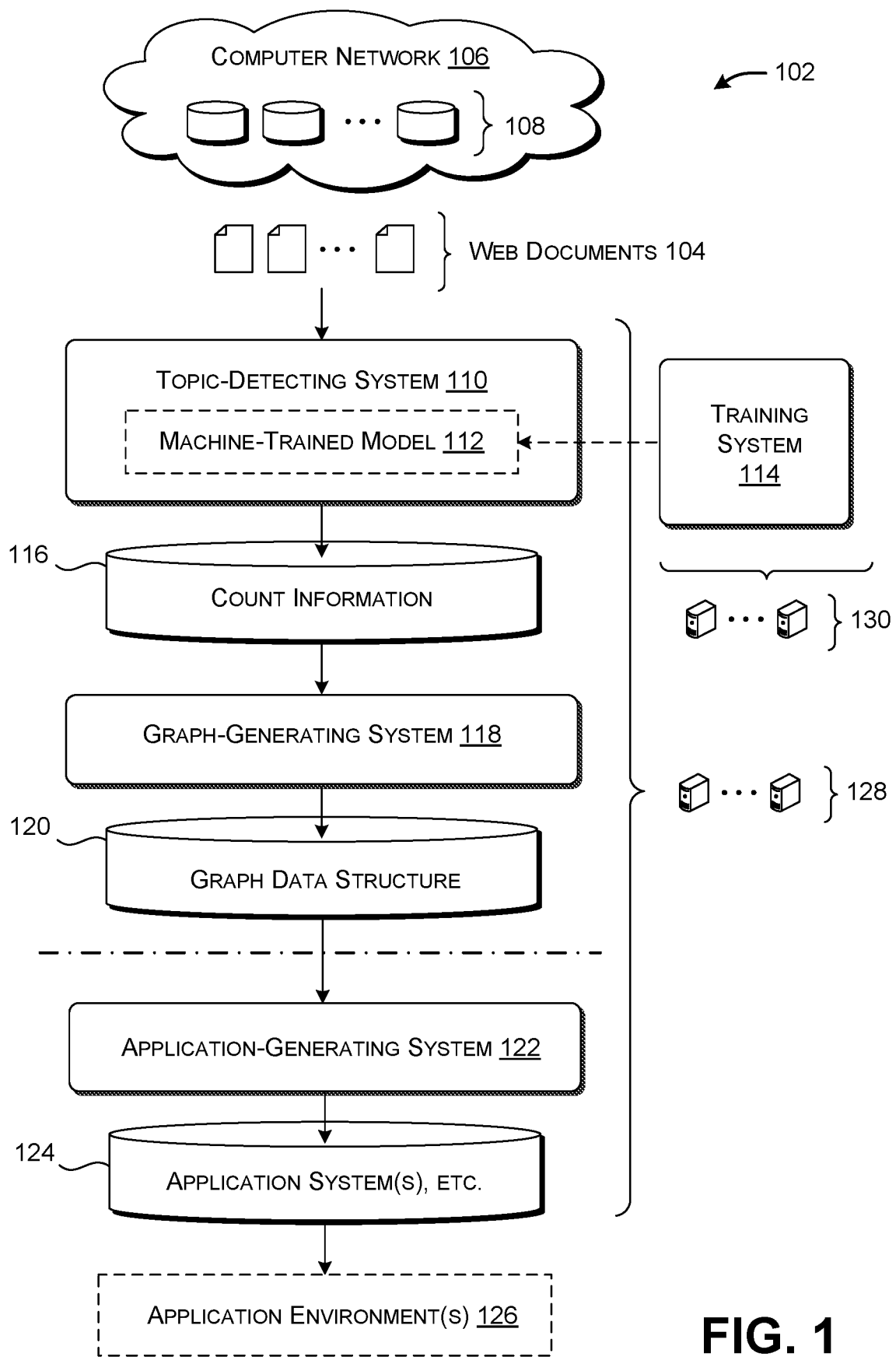
FIG. 1 shows an overview of a computing environment for producing a graph data structure that identifies relations of topics expressed by web documents. The computing environment also uses the graph data structure to produce one or more application systems.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes computer-implemented environments for creating and applying an application system, where the application system leverages a graph data structure that expresses relations among topics detected in web documents. Section B sets forth illustrative methods that explain the operation of the computing environments of Section A. And Section C describes illustrative computing functionality that can be used to implement any aspect of the features described in Sections A and B.

As a preliminary matter, the term "hardware logic circuitry" corresponds to technology that includes one or more hardware processors (e.g., CPUs, GPUs, etc.) that execute machine-readable instructions stored in a memory, and/or one or more other hardware logic units (e.g., FPGAs) that perform operations using a task-specific collection of fixed and/or programmable logic gates. Section C provides additional information regarding one implementation of the hardware logic circuitry. In some contexts, each of the terms "component," "engine," "module," "logic," "system," "model," "mechanism," and "tool" refers to a part of the hardware logic circuitry that performs a particular function.

In one case, the illustrated separation of various parts in the figures into distinct units may reflect the use of corresponding distinct physical and tangible parts in an actual implementation. Alternatively, or in addition, any single part illustrated in the figures may be implemented by plural actual physical parts. Alternatively, or in addition, the depiction of any two or more separate parts in the figures may reflect different functions performed by a single actual physical part.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). In one implementation, the blocks shown in the flowcharts that pertain to processing-related functions can be considered respective logic components and can be implemented by the hardware logic circuitry described in Section C, which, in turn, can be implemented by one or more hardware processors and/or other logic units that include a task-specific collection of logic gates.

As to terminology, the phrase "configured to" encompasses various physical and tangible mechanisms for performing an identified operation. The mechanisms can be configured to perform an operation using the hardware logic circuitry of Section C. Any of the storage resources described herein, or any combination of the storage resources, may be regarded as a computer-readable medium. In many cases, a computer-readable medium represents some form of physical and tangible entity. The term computer-readable medium also encompasses propagated signals, e.g., transmitted or received via a physical conduit and/or air or other wireless medium, etc. However, the specific term "computer-readable storage medium" expressly excludes propagated signals per se, while including all other forms of computer-readable media.

The following explanation may identify one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Further, the term "plurality" refers to two or more items, and does not necessarily imply "all" items of a particular kind, unless otherwise explicitly specified. Further still, the descriptors "first," "second," "third," etc. are used to distinguish among different items, and do not imply an ordering among items, unless otherwise noted. Finally, the terms "exemplary" or "illustrative" refer to one implementation among potentially many implementations, and may not necessarily refer to a preferred implementation.

A. Illustrative Computing Environment

A.1. Overview

FIG. 1 shows an overview of a computing environment 102 for producing a graph data structure that expresses the conditional probability of topics occurring in document units. The computing environment 102 also produces an application system based, in part, on the graph data structure. The application system provides some kind of computer-implemented service to a user, examples of which are set forth below.

The term "document unit" as used herein can refer to document information having a specified scope. Jumping ahead momentarily in the sequence of figures, FIGS. 3-5 show three interpretations of the term document unit. In FIG. 3, a document unit corresponds to an individual web document 302. The individual web document 302 includes information that expresses a topic A and a topic B. In FIG. 4, a document unit corresponds to a group of at least two web documents that are linked to each other via at least one link. Here, a web document 402 expresses a topic A and a web document 404 expresses a topic B, and web document 402 includes a link that points to web document 404. In FIG. 5, a document unit corresponds to part 502 of a single web document 504. For example, the part 502 may correspond to a section of a page that expresses both Topics A and B, such as a title, abstract, single paragraph, etc. The term "document unit" can encompass yet other informational scopes. However, to facilitate explanation, the following description will often make the simplifying assumption that a document unit refers to a single web document. Any subsequent mention of "web document" should be construed as more generally referring to a "document unit" having any scope.

The computing environment 102 of FIG. 1 operates on a set of web documents 104 that are accessible via a computer network 106, such as the Internet. A distributed collection of data stores 108 provides these web documents. A web document itself corresponds to a unit of information provided by a wide area network, such as the Internet. For instance, the web document may correspond to a network-accessible page associated with any domain and having any type and quality of content.

A topic-detecting system 110 detects topics in the web documents 104 using a machine-trained model 112. In one case, the topic-detecting system 110 receives the documents 104 directly from the distributed data stores 108, e.g., using a push-based approach, a pull-based approach, or a combination thereof. Alternatively, or in addition, the computing environment 102 can perform the preliminary operation of retrieving the documents or retrieving information extracted therefrom and storing that information in a single repository of information, such as an index; here, the topic-detecting system 110 can operate on document information provided in that single repository of information.

The topic-detecting system 110 uses the machine-trained model 112 to determine what topics are expressed by each web document (or more generally, which document unit). Subsection A.3 provides additional information regarding illustrative implementations of the topic-detecting system 110. By way of introduction, the topic-detecting system 110 receives a set of tokens associated with words contained in a web document under consideration, optionally together with other information contained in or otherwise associated with the web document. Based on those tokens, the topic-detecting system 110 uses the machine-trained model 112 to determine the most likely topics that are expressed by the web document. For instance, the topic-detecting system 110 can generate a probability score for each candidate topic within a set of possible candidate topics. The topic-detecting system 110 can determine that web document expresses a candidate topic if the probability score for that candidate topic exceeds a prescribed environment-specific threshold value. For example, in one instance, the topic-detecting system 110 can determine that a web document is likely to express three topics: "football," "Seahawks," and "Seattle." This is because the topic-detecting system 110 determines that the probability score of each of these topics is above the prescribed threshold value.

A few general characteristics of the topic-detecting system 110 are set forth below. First, the topic-detecting system 110 need not identify what part(s) of the web document express a particular document. For example, the topic-detecting system 110 may identify that the web document pertains to the topic of the football team "Seahawks," without specifying what section(s) of the web document pertain to this subject. Because the topic-detecting system 110 performs a limited and streamlined task, it is efficient.

Second, the topic-detecting system 110 can identify semantically overlapping themes. For example, in the above case, the topic-detecting system 110 identifies "football" and "Seahawks" as two themes expressed by the same web document. Here, "Seahawks" is a particular football team in the Seattle region of the United States, so that "Seahawks" may be considered a subtopic subsumed within the general category of "football." Indeed, it is likely that the topic-detecting system 110 will generate overlapping topics because it maps the content of a web page to one or more vectors in a semantic space. At least some of these vectors are likely to be relatively close together in semantic space (e.g., as measured by cosine similarity or some other distance metric), and therefore are likely to convey related concepts.

Third, there is no expectation that the web documents 104 originate from the same domain or contain content having the same quality. For example, the web documents 104 can include a diverse collection of news articles, fan blogs, product pages, encyclopedia-type entries, etc. Such information is produced by different sources and is intended to serve different markets and objectives. This characteristic of the topic-detecting system 110 also contributes to its efficiency. That is, the topic-detecting system 110 is said to be efficient in this regard because it does not require specialized algorithms or model variations to account for different kinds of web documents.

A training system 114 generates the machine-trained model 112 in an offline training process. In addition, the training system 114 can dynamically update the machine-trained model 112 as new training data is received. Additional information regarding the training system 114 is set forth below in Subsection A.3.

The topic-detecting system 110 produces count information which it stores in a data store 116. More specifically, the topic-detecting system 110 counts a number of times each topic in a plurality of candidate topics occurs within the set of web documents. The topic-detecting system 110 also counts a number of times a particular combination of two topics co-occurs within the set of web documents. Consider the above example, in which the topic-detecting system 110 determines that a particular web document includes the topics "football," "Seahawks," and "Seattle." Upon reaching this conclusion, the topic-detecting system 110 will: (1) increment a first counter that identifies a number of web documents that express the topic of "football"; (2) increment a second counter that identifies a number of web documents that express the topic "Seahawks"; (3) increment a third counter that identifies a number of times that the web document express the topic "Seattle"; (4) increment a fourth counter that identifies a number of times in which the topics of "football" and "Seahawks" co-occur in the web documents; (5) increment a fifth counter that identifies a number of times in which the topics of "football" and "Seattle" co-occur in the web documents; and (6) increment a sixth counter that identifies a number of times in which the topics of "Seahawks" and "Seattle" co-occur in the web documents.

In one implementation, the topic-detecting system 110 can optionally generate separate counts for different document scopes. That is, in the example set forth above, the topic-detecting system 110 generates count information for the case in which a document unit under consideration is an individual web document. Here, the topic-detecting system 110 increments a count when the individual web document includes a particular topic or a particular pairing of topics. In the example of FIG. 4, the topic-detecting system 110 can treat two linked web documents as a single document unit. For example, the first web document 402 may provide a first news article containing a link that points to the second web document 404. Assume that the first web document 402 includes the word "Seattle" and the second web document 404 includes the name "Seahawks." Upon detecting these topics, the topic-detecting system 110 can: (1) increment another counter that identifies a number of linked pairings of web documents that express the topic of "Seahawks"; (2) increment another counter that identifies a number of linked pairings of web documents that express the topic of "Seattle"; and (3) increment another counter that indicates identifies a number of times in which the topics "Seahawks" and "Seattle" occur in linked pairings of web documents. Similarly, the topic-detecting system 110 can generate counts for the case of FIG. 5 that identify when topics and pairings of topics occur within a single section of a web document, such as a single paragraph or a single section of an article, etc. To facilitate explanation, however, the following explanation will continue to emphasize the example in which a document unit has a scope that corresponds to a single web document.

A graph-generating system 118 produces a graph data structure based on the count information provided in the data store 116. A graph data structure means any organization of information that can be characterized as a set of entities and relationships among entities. The graph data structure may represent the entities as nodes and the set of relationships as edges, each of which connects a respective pairing of nodes. In the present case, the nodes in the graph data structure represent topics identified by the topic-detecting system 110. The edges represent hierarchical relationships between topics. In the example described above, the graph data structure may include at least three nodes pertaining to the topics of "football," "Seahawks," and "Seattle." A link pointing from "football" to "Seahawks" may indicate that "Seahawks" is a subtopic of "football." A link pointing from "Seattle" to Seahawks" may indicate that "Seahawks" is also a subtopic of "Seattle." There may be no link between "Seattle" and "football" if the graph-generating system 118 determines that there is insufficient empirical evidence that these topics have a hierarchical relationship (although the evidence could indicate otherwise for a different set of web documents).

The graph-generating system 118 determines the hierarchical relationships among topics by determining conditional probability information for each pairing of topics, e.g., topic A and topic B. More specifically, the graph-generating system 118 determines the conditional probability P(A|B) that the topic A will occur in a web document (or more generally, a document unit), given the presumed occurrence of the topic B. This conditional probability equals the number of times the topics A and B occur in the same web documents (or more generally, the same document units), divided by the number of times that the topic B occurs in the web documents (or more generally, the document units). The graph-generating system 118 also determines the conditional probability P(B|A) that the topic B will occur in a web document (or more generally, a document unit), given the presumed occurrence of the topic A. This conditional probability equals the number of times that topics A and B occur together in the web documents (or more generally, the same document units), divided by the number of times that the topic A occurs in the web documents (or more generally, the document units).

In one implementation, the graph-generating system 118 will indicate that topic B is a subtopic of topic A when P(B|A) is below a prescribed threshold value (e.g., 0.5 in one non-limiting case) and P(A|B) is above the threshold value. The graph-generating system 118 will indicate that the topic A is a subtopic of topic B when P(B|A) is above the threshold value and P(A|B) is below the threshold value. In one implementation, the following three alternative possibilities exist: (a) there is no hierarchical relationship between topics; (b) topic B is a subtopic of topic A; or (c) topic A is a subtopic of topic B. The graph-generating system 118 stores the graph data structure in a data store 120. The threshold value is environment-specific in nature and can be tuned based on empirical evidence offered by a particular set of web documents.

Other implementations can consider yet more complex scenarios. For example, in another implementation, the graph-generating system 118 can identify some cases in which topic B is a subtopic of topic A, and other cases in which topic A is a subtopic of topic A. For example, one may imagine news articles that treat "New York City" as a subtopic of "New York State," and other news articles in which the primary focus of attention is "New York City," upon which "New York State" might be considered as subtopic of "New York City."

In one implementation, the graph-generating system 118 can use different weighting factors when computing each conditional probability score. For example, the graph-generating system 118 can apply a weighting factor to a co-occurrence that depends on the scope in which two topics occur together. For instance, the graph-generating system 118 can apply a first weight value w1 for the case in which topics A and B occur within a same document section (such as a same paragraph), as indicated in the example of FIG. 5. It can apply a second weight value w2 for the case in which topics A and B occur within the same web document, as indicated in the example of FIG. 3. It can apply a third weight value w3 for the case in which the topics A and B occur within two linked documents, as indicated in the example of FIG. 4. In one example, w1>w2>w3, generally indicating that the importance of an individual co-occurrence increases as the scope in which topics A and B co-occur shrinks. In other implementations, however, the graph-generating system 118 does not discriminate among the cases of FIGS. 3, 4, and 5, weighting them all by the same amount (e.g., a value of 1.0). Or, as noted, the graph-generating system 118 can performs its analysis using on a single interpretation of document scope, such as the case of FIG. 3 in which a document unit corresponds to a single web document.

Alternatively, or in addition, the graph-generating system 118 can apply a weighting factor to any topic occurrence or co-occurrence depending the quality of informational content imparted by document unit associated with the occurrence or co-occurrence. For example, the graph-generating system 118 can apply a first quality value q1 if the document unit under consideration is a web page associated with a news article or encyclopedia entry, and a second quality value q2 if the document unit under consideration is a social network message, such as a tweet provided by the TWITTER system of San Francisco, Calif. The graph-generating system 118 can provide yet other environment-specific variations to the above implementation.

An application-generating system 122 generates one or more application systems based on the graph data structure provided in the data store 120. An application system generally refers to any component that provides a computer-implemented service to end users. Subsection A.2 (below) will set forth illustrative application systems. By way of introduction to that later explanation, the application systems can include a search engine, recommendation engine, chatbot agent, etc. A data store 124 can store the application system(s), e.g., by storing the machine-readable instructions that implement each applications system, the parameter values that implement each machine-trained model, etc. One or more application environments 126 correspond to the settings in which users interact with the application systems One application environment may use a search engine to receive an input query from a user. The search engine can use a machine-trained model to determine the topic(s) expressed by the input query. The search engine can then consult the graph data structure to identify the topic(s) that are related to the identified topic(s). The search engine can use this insight, together with other information, to find documents that match the user's input query. Alternatively, or in addition, the search engine can use the information provided in the graph data structure, along with other information, to rank the importance of web documents, e.g., using a random walk algorithm such as the PAGERANK algorithm. The search engine relies on a ranking produced by the random walk algorithm in selecting web documents that match the user's input query. Still other application environments are possible, as will be set forth below in Subsection A.2.

One or more computing devices (e.g., servers) 128 can implement the topic-detecting system 110, graph-generating system 118, application-generating system 122, and data stores (116, 120, 124). One or more computing devices (e.g., servers) 130 can implement the training system 114.

Figure 2:
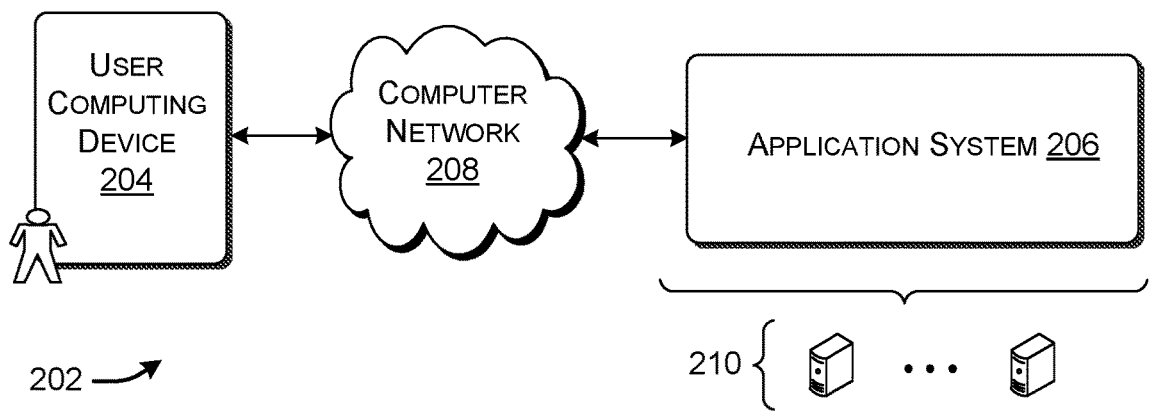
FIG. 2 shows an illustrative computing environment in which a user computing device interacts with an application system produced via the computing environment of FIG. 1.

Advancing to FIG. 2, this figure shows an illustrative computing environment 202 in which a user computing device 204 interacts with an application system 206 produced using the computing environment 102 of FIG. 1. For instance, the user may interact with the application system 206 using a browser application (not shown) provided by the user computing device 204. A computer network 208 connects the user computing device 204 with the application system 206. The user computing device 204 can correspond to any of a personal desktop computing device, a laptop computing device, a game console, a set-top box, any type of handheld computing device (e.g., a smartphone, a tablet-type computing device, etc.), a wearable computing device, an Internet-of-Things (IoT) device, a mixed-reality device, and so on, or any combination thereof. The computer network 208 may correspond to a local area network, a wide area network (e.g., the Internet), one or more point-to-point links, and so on, or any combination thereof. One or more computing devices 210 (e.g., one or more servers) may implement the application system 206.

More specifically, FIG. 2 shows the example, in which the remote computing devices 210 implement the application system 206. In another case, the functionality of the application system 206 can be distributed between the user computing device 204 and the remote computing devices 210. In another case, the user computing device 204 can implement the entirety of the application system, eliminating the need for the remote computing devices 210 (that is, with respect to the service provided by the application system 206).

Figure 6:
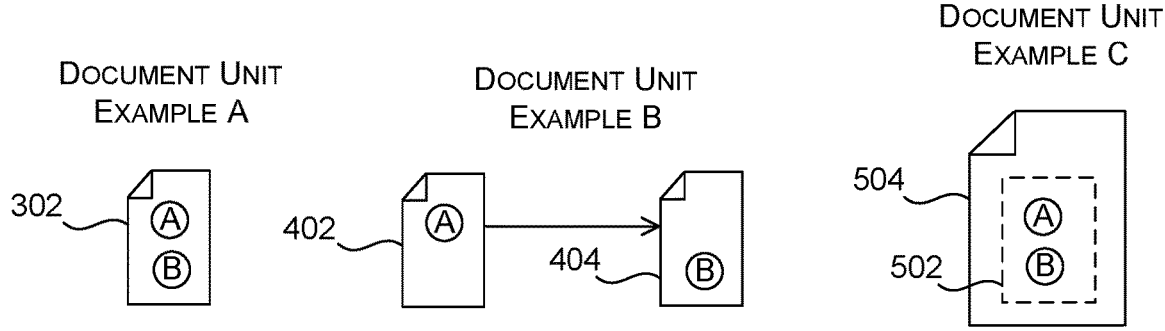
FIG. 6 shows count information produced by the computing environment of FIG. 1.

FIG. 6 shows count information produced by the topic-detecting system 110 of FIG. 1. In this merely illustrative case, a data table 602 provides the count information as a matrix of values. A value at any given cell in the matrix defines the number of co-occurrences of a particular first topic (identified by a row number) and a particular second topic (identified by a column number). For example, a cell located at the intersection of the row for topic C and the column for topic B is "112," which indicates that 112 web documents (or other document units) express both the topics C and B. The cells along the diagonal of the matrix indicate the number of web documents (or other document units) that express a particular topic. For instance, a cell located at the intersection of the row for topic and the column for topic C has a value of "545," which indicates that 545 web documents (or other document units) express the topic C.

In one case, the topic-detecting system 110 provides and updates a single count value that expresses occurrence (or co-occurrences) with respect to all document scopes. For instance, the above-noted cell that indicates that topics C and B have co-occurred 112 times means that topics C and B have appeared together 112 times across all the kinds of scopes summarized in FIGS. 3-5. In another implementation, the topic-detecting system 110 can store count values for different respective document scopes. For example, although not shown in FIG. 6, the topic-detecting system 110 can store a first count value that indicates the number of times that topics C and B have occurred in the same document section (e.g., the same paragraph). It can store a second count value that indicates the number of times in topics C and B have occurred within the same web document. It can store a third count value that indicates the number of times that topics C and D have occurred together in a pairing of linked documents, and so on.

FIG. 7 shows a highly simplified example of the operation of the graph-generating system 118. Assume here that there are only two web documents (702, 704) under consideration. The first web document 702 expresses the topics of "basketball" and "sports." The second web document 704 expresses the topics of "football" and "sports." The graph data structure will therefore include nodes associated with at least the topics of "sports," "basketball" and "football." In actual practice, the graph data structure can include hundreds, thousands, millions, etc. of nodes associated with different respective topics.

The conditional probability of P(basketball|sports) is the number of web documents in which "basketball" occurs together with "sports" (here one occurrence) divided by the number of web documents in which "sports" occurs (here two occurrences). P(basketball|sports) is therefore 1/2 or 0.5. The conditional probability of the P(football|sports) is the number of web documents in which "football" occurs together with "sports" (here one occurrence) divided by the number of web documents in which "sports" occurs (here two occurrences). P(football|sports) is therefore also 1/2 or 0.5. The conditional probability of P(sports|basketball) is the number of web documents in which "sports" occurs together with "basketball" (here one occurrence) divided by the number of web documents in which "basketball" occurs (here one occurrence). P(sports|basketball) is therefore 1/1 or 1.0. The conditional probability of the P(sports|football) is the number of web documents in which "sports" occurs together with "football" (here one occurrence) divided by the number of web documents in which "football" occurs (here one occurrence). P(sports|football) is therefore also 1/1 or 1.0.

The graph-generating system 118 compares each conditional probability score with a prescribed tunable threshold value (e.g., 0.5 in one non-limiting case) to overall produce comparison results. The graph-generating system 118 determines the hierarchical relations among topics based on the comparison results. In this example, the graph-generating system 118 will determine that "basketball" and "football" are subtopics of "sports," but that "sports" is not a subtopic of either "basketball" or "football." This is because P(sports|basketball) is above 0.5, while P(basketball|sports) does not exceed 0.5. The same is true with respect to P(sports|football) and P(football|sports). Further assume that the conditional probability scores for "basketball" given "football" and "football" given "basketball" do not establish a hierarchical relation between these two topics. In response to these findings, the graph-generating system 118 can establish a first link in the graph data structure that points from the node for "sports" to the node for "basketball," and a second link in the graph data structure that points from the node for "sports" to the node for "football."

FIG. 8 shows a sample of a graph data structure produced by the computing environment of FIG. 1, expressed here in table form. This graph data structure includes an entry 802 that indicates that the conditional probability of P(orchestral music|symphonies) is 0.612, while the conditional probability of P(symphonies|orchestral music) is 0.420. If the threshold value is 0.5, this would indicate that "symphonies" is a subtopic of "orchestral music." The graph data structure includes another entry 804 that indicates that the conditional probability of P(orchids|farming) is 0.002, while the conditional probability of P(farming|orchids) is 0.530. This would indicate that "orchids" is a subtopic of "farming." The graph data structure includes another entry 806 that indicates that the conditional probability scores for both P(orchids|leaves) and P(leaves|orchids) are below 0.50. This would indicate that "orchids" and "leaves" have no hierarchical relationship. Although not shown, two nodes that have conditional probability scores (P(A|B) and P(B|A)) above 0.50 would be labeled as having no hierarchical relationship.

Figure 9:
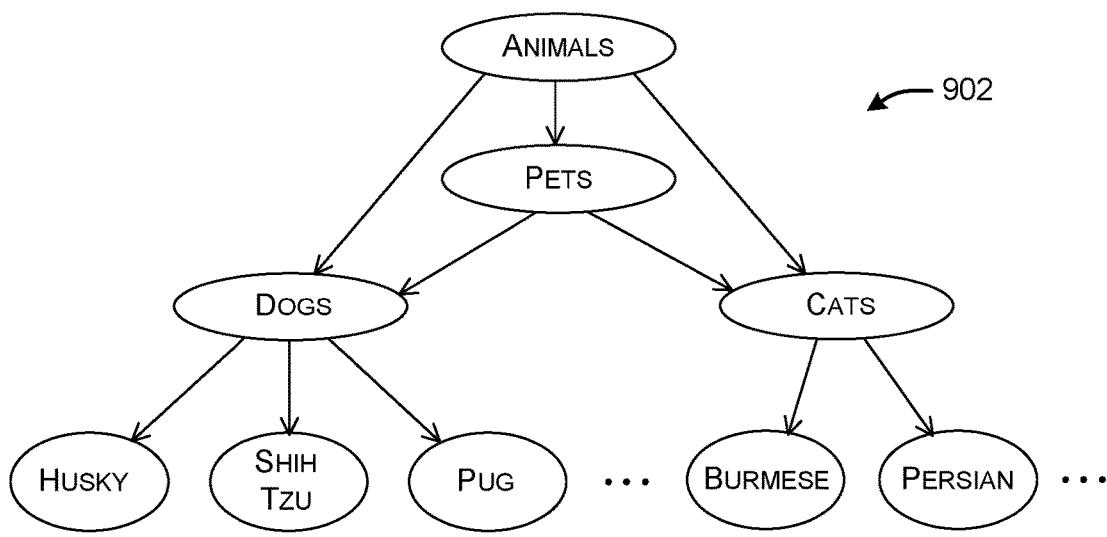
FIG. 9 shows another sample of a graph data structure produced by the computing environment of FIG. 1, expressed here in graphical form.

FIG. 9 shows a small portion of an illustrative graph data structure 902. This example indicates that the graph-generating system 118 has determined that "pets" is a subtopic of "animals," "dogs" is a subtopic of both "animals" and "pets," and "cats" is also a subtopic of both "animals" and "pets." The graph data structure 902 also indicates that different breeds of dogs are subtopics of "dogs," and different breeds of cats are subtopics of "cats." This graph data structure 902 is generally meant to convey that the graph-generating system 118 can generate a rich summary of the relationships among topics expressed by web documents. In other words, the graph-generating system 118 operates by analyzing respective pairs of individual topics. As a whole, however, the individual conclusions of the graph-generating system 118 may contribute to a nest of relationships among a potentially large number topics.

The computing environment of FIG. 1 can be varied in different ways. For example, the above explanation set forth the case which the graph-generating system 118 computes each conditional probability score for P(A|B) based on a consideration of the number of times topics A and B co-occur in the web documents, divided by the number of times that topic B occurs in the web documents. In another implementation, the graph-generating system 118 can form other more complex conditional probabilities, such as P(A|B∪C), meaning the probability that topic A occurs within a document based on the given co-occurrence of topics B and C in the document, etc.

In another implementation, the graph-generating system 118 can use a machine-trained neural network or other type of model to compute a conditional probability score. The neural network can receive and operate on the above-described of aggregate count information, e.g., as shown in FIG. 6. Alternatively, or in addition, the neural network can receive and operate on an input vector that describes individual occurrences and co-occurrences of topics in the web documents. For example, assume that, in one instance, a topic A occurs in a title of a web document associated with a news-related domain. The input vector could express this single occurrence with this level of granularity.

A.2. Illustrative Application Systems

Figure 10:
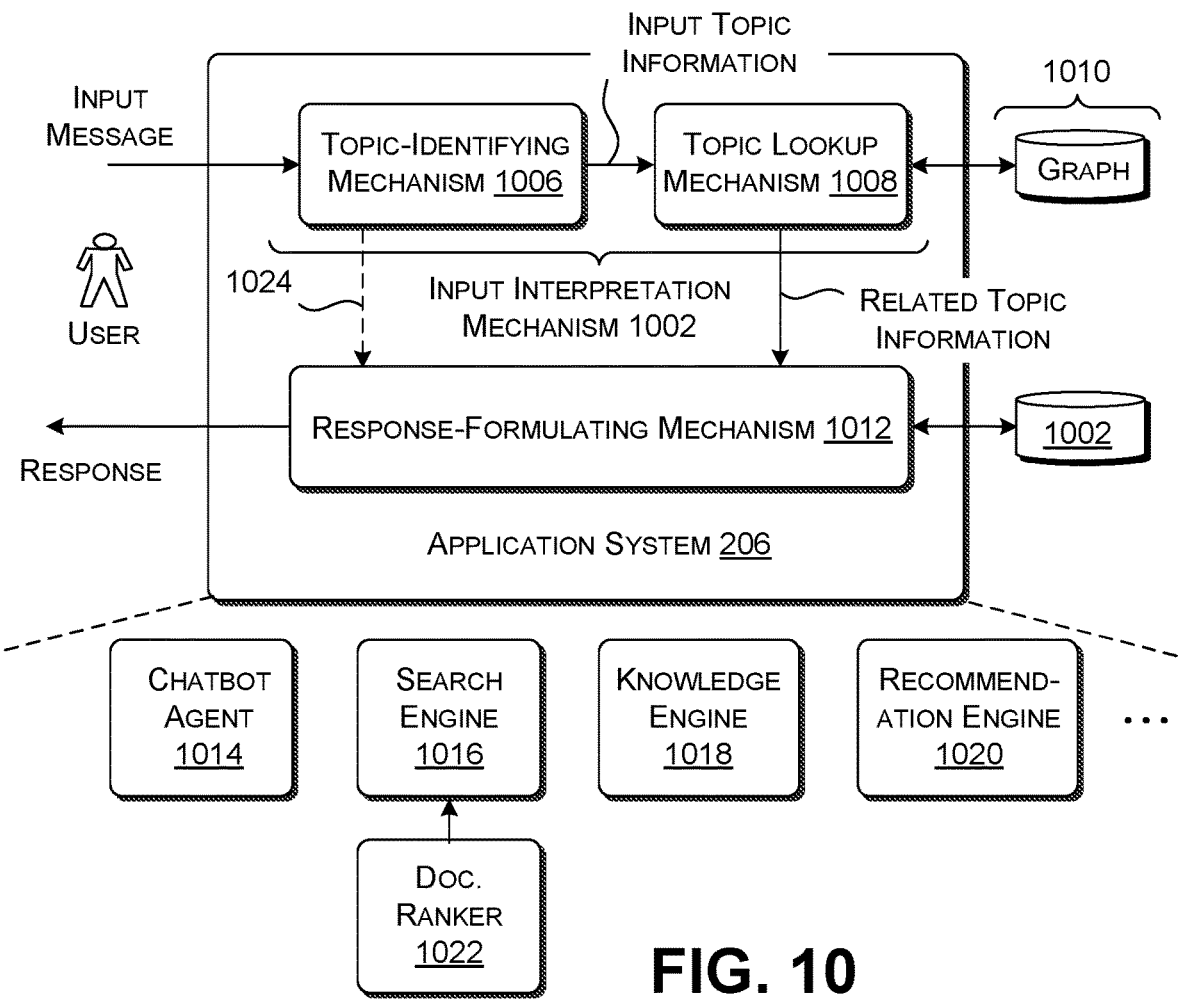
FIG. 10 shows an illustrative application system produced by the computing environment of FIG. 1.

FIG. 10 shows an illustrative application system 206 produced by the computing environment 102 of FIG. 1. Generally, the application system 206 receives an input message from a user computing device 204 (not shown in FIG. 10). The application system 206 uses, in part, the conditional probability information provided la the graph-generating system 118 to generate a response, which it then forwards to the user computing device 204. The application system 206 can interact with one or more data stores 1002 in generating its response In many illustrative but non-limiting scenarios, the application system 206 can use an input interpretation mechanism 1004 to interpret the user's input message. For example, the application system 206 can use a topic-identifying mechanism 1006 to interpret the topic(s) associated with the user's input message. For instance, the topic-identifying mechanism 1006 can use a multi-class classification model (such as a deep neural network of any type) that maps tokens in the user's input message into an indication of at least one topic that is most likely associated with the input message. The topic-identifying mechanism 1006 produces input topic information that expresses the detected topic(s) in the input message. A topic lookup mechanism 1008 then consults a graph data structure provided by a data store 1010 (and produced by the graph-generating system 118 of FIG. 1) to identify one or more topics (if any) that have relationships with the input topic information. The topic lookup mechanism 1008 provides related topic information that expresses the identified related topic(s). A response-formulating mechanism 1012 can then use the related topic information to formulate a response to the user. In doing so, the response-formulating mechanism 1012 can interact with the data store 1002. For instance, the data store 1002 may provide a search index, a knowledge graph, etc.

The above kind of application system 206 can assume different forms in different environments. In one environment, the application system 206 corresponds to a chatbot agent 1014 that provides a conversational interface with the user. Here, the topic-identifying mechanism 1006 can identify input topic information expressed by the user's input question or command. The topic lookup mechanism 1008 can then use the graph data structure to identify the topics ("related topics") that are related to the input topic information. In at least some cases, the related topics may correspond to subtasks within a main task the user is presumed to be attempting to complete. For example, upon determining that the user's input message pertains to the topic of "travel," the topic lookup mechanism 1008 can consult the graphical data structure in the data store 1010 to identify that this topic has child nodes corresponding to the subtasks of "airline reservation," "hotel reservation," and "car rental reservation." The response-formulating mechanism 1012 can then assist the user in completing each such subtask, e.g., using pre-generated scripts, a machine-trained response-generating model, etc. Alternatively, or in addition, the input interpretation mechanism 1004 can used the related topic information to help disambiguate the user's input message.

In another environment, the application system 206 corresponds to a search engine 1016. Here the topic-identifying mechanism 1006 can again identify input topic information expressed by the user's input query. The topic lookup mechanism 1008 can then use the graph data structure in the data store 1010 to identify the topics ("related topics") that are related to the input topic information. The response-formulating mechanism 1012 can then use any of the related topic information to supplement and enhance the user's input query, e.g., by appending the related topic information to the search query to produce an expanded query. The response-formulating mechanism 1012 can then find one or more websites that match the expanded query. The response-formulating mechanism 1012 can perform this task by matching features associated with the user's expanded query against a pre-generated search index provided in the data store 1002. Alternatively, or in addition, the response-formulating mechanism 1012 can use the related topic information to provide query suggestions to the user, e.g., by inviting the user to input query terms pertaining to any of the related topics that have been identified.

In another environment, the application system 206 corresponds to knowledge engine 1018 that is configured to answer the user's input question. The topic-identifying mechanism 1006 can again identify the input topic information expressed by the user's input question. The input interpretation mechanism 1004 can also use an intent-identifying mechanism (such as a deep neural network, not shown) to map the tokens in the input message to an output conclusion that identifies a presumed intent that the user is attempting to accomplish by submitting the input message. Presume that, in one case, the intent of the user is to discover information that has a relational bearing to the input topic information. This might be true when the user inputs a question such as "What U.S. state is Santa Fe located in?", or a question such as "What are examples of U.S. mountains?", etc. In this case, the topic lookup mechanism 1008 can then use the graphical data structure in the data store 1010 to identify those nodes that are related to the input topic information, collectively corresponding to related topic information. The response-formulating mechanism 1012 can then utilize the related topic information, in part, to formulate a response to the user's input question. For example, the response-formulating mechanism 1012 can match features associated with the user's interpreted input question (including the related topic information) against a set of pre-generated answers in the data store 1002, to find an answer that best matches the user's input question. The response-formulating mechanism 1012 can then forward a response to the user that expresses the pre-generated answer to the user.

In another environment, the application system 206 corresponds to recommendation engine 1020. Here, the input interpretation mechanism 1004 can include a context-identifying mechanism (not shown) that identifies context information that describes the current context in which the user is interacting with the computing environment 202. For example, the context-identifying mechanism can identify the user's current context based on any of: an input message provided by the user; a page or document with which the user is currently interacting; a selection that the user has made on a page; demographic information pertaining to the user; history information that identifies prior selections, purchases, etc. made by the user, the current location of the user, the current time, and so on. The topic-identifying mechanism 1006 can map any of this context information into input topic information. The topic lookup mechanism 1008 can then use the graph data structure in the data store 1010 to find topics ("related topics") that are related to the input topic information. The response-formulating mechanisms 1012 can then identify one or more recommended items that pertain to the related topic information. For instance, the response-formulating mechanism 1012 can perform this task by matching features associated with the current context (including the related topic information) against a pre-generated search index provided in the data store 1002. The response-formulating mechanism 1008 can then generate a response that identifies the recommended item(s).

For example, consider the case in which the user is currently viewing a product page for a particular type of hat. And assume that the graphical data structure includes a parent node associated with the general topic of hats, together with plural child nodes associated with different brands and/or styles of hats. The recommendation engine 1020 can use the graph data structure to identify other hats that are related to the hat the user is currently viewing, e.g., by identifying other child nodes that have the same parent node as the hat that the user is currently viewing. The recommendation engine 1020 can then provide the user with suggestions that invite the user to explore pages associated with the identified related hats. An advertising engine (not shown) can operate on the same principle describe above; here, the recommended items correspond to advertisements sponsored by respective advertisers In another environment, the application system 206 corresponds to a filing engine (not shown) that allows the user to store a submitted document at an appropriate location in the data store 1002. Here, the topic-identifying mechanism 1006 can use a machine-trained model to identify at least one topic associated with the input document. The topic lookup mechanism 1008 can then consult the graph data structure to find one or more topics ("related topics") that are related to the input topic(s). And the response-formulating mechanism 1012 can store the input document at one or more locations in the data store 1002 associated with the identified topic(s). For example, the response-formulating mechanism 1012 can store the input document in folders that are associated with the input topic(s) identified by the topic-identifying mechanism 1006 and/or the related topic (s) identified by the topic lookup mechanism 1008. The response-formulating mechanism 1012 can then provide a response to the user that identifies the storage actions it has taken.

The above-identified application systems are set forth herein in the spirit of illustration, not limitation. Still other kinds of applications can leverage the graph data structure produced by the computing environment 102 of FIG. 1. For example, another application system (not shown) can use the graph data structure to identify clusters of similar items. Another application system (not shown) can use the graph data structure to help route a message to an appropriate target destination. Another application system (not shown) can use the graph data structure to identify matching social contacts, and so on.

In other cases, the application system 206 can use the graphical data structure to respond to user's input message in a more indirect manner than the examples set forth above. For example, a document ranker 1022 can use the information imparted by the graph data structure, along with other information, to rank web documents. For instance, consider any random walk algorithm, such as the PAGERANK algorithm. In its traditional formulation, the PAGERANK algorithm operates on a web graph that describes web documents (represented in the graph by nodes) and links between pairs of web documents (represented in the graph as edges). More specifically, an outbound link refers to link from a web page under consideration to another web page. An inbound link refers to any link that points from another web page to the web page under consideration. The goal of the PAGERANK algorithm is to assign a ranking score $R(p_1)$ to each node $p_i$ in the web graph associated with a particular web page, which describes the importance of that web page relative to other web pages.

In one implementation, the PAGERANK algorithm calculates each ranking score based on the following equation:

$$R(p_i) = \frac{1-\alpha}{N} + \alpha \sum_{p_j \in S(p_i)} \frac{R(p_j)}{L(p_j)}.$$

The term $p_j$ refers to a node that links to the node $p_i$ under consideration, within a set $S(p_1)$ of such nodes that link to the node $p_i$. $R(p_j)$ is the ranking score associated with a node $p_j$, and $L(p_j)$ is the number of links that point outward from the node $p_j$. N is the number of nodes in the subgraph, and $\alpha$ is a constant damping factor.

The document ranker 1012 shown in FIG. 10 can modify the traditional PAGERANK algorithm by using information obtained from the graph data structure (generated by the graph-generating system 118) to modify the weights of the links. For example, consider the case in which a node under consideration (associated with a first web page) contains an outbound link to another node (associated with a second web page). The graph data structure can be used to identify whether these two linked data pages also express topics that are related to each other. For example, the first web page may express the topic of "football" while the second web page may express the topic of "Seahawks." If this relationship is present, the document ranker 1012 can apply a weight value to this link that boosts it relevance relative to the situation in which the two web pages are not related. Alternatively, or in addition, the document ranker 1012 can apply a boosting value to the score for the node itself when its corresponding web page expresses a topic in the graph data structure, or a topic in a particular class of topics identified by the graph data structure. Still other ways of modifying the traditional PAGERANK algorithm (or other random walk algorithm) are possible; the above examples are presented in the spirit of illustration, not limitation.

The above implementation is a specific example of a more general case in which the response-formulating mechanism 1012 is configured to incorporate information imparted by the graph data structure produced by the graph-generating system 118 of FIG. 1. In this case, the application system 206 need not perform an inference-stage interrogation of the graph data structure in the data store 1010 in response to the user's submission of the input query. FIG. 10 illustrates this point by showing a dashed line 1024 from the topic-identifying mechanism 1006 to the response-formulating mechanism 1012.

In another example of this type of application system 206, an offline knowledgebase-updating engine (not shown) can update an existing knowledge graph used by the knowledge engine 1018 to incorporate information obtained from the graph data structure produced by the graph-generating system 118 of FIG. 1. For example, the knowledgebase-updating engine can add a link to the existing knowledge graph that indicates that two existing nodes in the knowledge graph have a hierarchical relationship. Alternatively, or in addition, the knowledgebase-updating engine can add one or more new nodes to the existing knowledge graph based on the insight obtained from the graph data structure produced by the graph-generating system 118 of FIG. 1. For example, the knowledgebase-updating engine can add a new child node to the existing parent node in the knowledge graph because the graph data structure reveals the existence of this new child node (which has a hierarchical relation with the parent node which also appears in the graph data structure). The knowledge engine 206 can interact with the updated knowledge graph without necessarily interrogating the graph in the data store 1010 in response to the user's submission of the input message.

In illustrative implementations, the application system 206 can successfully leverage the information imparted by the graph data structure to accurately interpret and efficiently process a user's input message. For instance, the search engine 1016 can use the information provided by the graph data structure to help find and retrieve a web document that matches an input query submitted by the user. In some cases, the application system 206 can be said to make efficient use of computing resources insofar as it can be expected to reduce the number of input messages that the user is required to submit to complete his or her task objectives. In some cases, the application system 206 can also be expected to contribute to a good user experience, e.g., by reducing an amount of time and labor that are required by the user to complete his or her task objectives, and reducing the number of inaccurate responses it provides to the user.

A.3. Illustrative Topic-Detecting System

In one implementation, the topic-detecting system 110 can be implemented as a multi-class classifier. The multi-class classifier receives input tokens contained in or otherwise associated with a web document under consideration. The input tokens correspond to words in the web document, optionally together with other content contained in the web document (described in greater detail below). The multi-class classifier then maps the input tokens to output information. The output information conveys the probability that the given web document expresses each candidate topic within a set of possible candidate topics.

The topic-detecting system 110 can implement the multi-class classifier using any type of neural network, such as a convolutional neural network (CNN), a transformer-based neural network, etc., or any combination thereof. A CNN can operate on tokens obtained from a web document using any combination of convolutional layers, pooling layers, and fully-connected layers. The CNN can apply a classification mechanism (such as a softmax layer) to the output of these preceding layers to identify likely topics expressed by the web document. Background information on the general topic of transformer-based architectures can be found in Devlin, et al., "BERT: Pre-training of Deep Bidirectional Transformers for Language Understanding," arXiv: 1810.04805v2 [cs.CL], May 24, 2019, 16 pages, and Vaswani, et al., "Attention Is All You Need," arXiv: 1706.03762v5 [cs.CL], Dec. 6, 2017, 15 pages. In another case, the topic-detecting system 110 can implement the multi-class classifier using a machine-trained model that is not a neural network, such as a decision tree model. In another case, the topic-detecting system 110 can implement a multi-class classifier using a rules-based system. For example, a rules-based system can apply an illustrative IF-THEN rule that states that: if any of a prescribed set of keywords is present in a document title, then the web document under consideration pertains to a particular topic.

In another approach, the topic-detecting system 110 can perform its function using a sequence-to-sequence machine-trained model, such as a recurrent neural network (RNN). The sequence-to-sequence model maps the input tokens into an output sequence that expresses at least one topic. In another approach, the topic-detecting system 110 can perform its function by scoring each actual word and phrase present in the candidate document. The score reflects the probability that the word or phrase expresses a topic associated with the candidate document. The above examples are described herein by way of illustration not limitation; other implementations of the topic-detecting system 110 can use yet other approaches to identify topics in a candidate web document.

Figure 11:
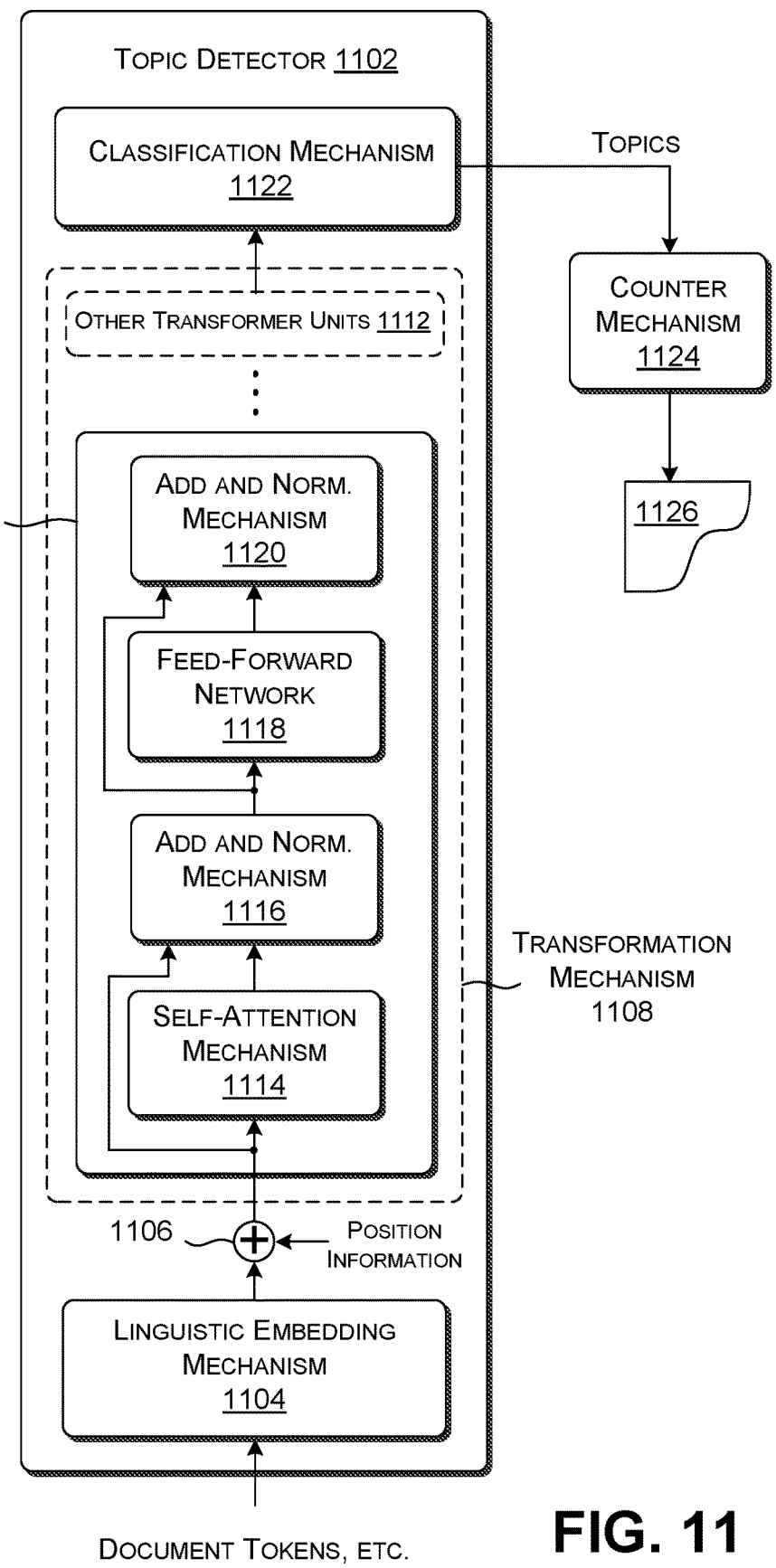
FIG. 11 shows an example of a topic-detecting system, which is one element of the computing environment of FIG. 1.

FIG. 11 shows one non-limiting implementation of the topic-detecting system 110 that uses a topic detector 1102. The topic detector 1102, in turn, is a neural network that incorporates transformer-based technology. Starting at the bottom of FIG. 10, a linguistic embedding mechanism 1104 transforms the input tokens in a web document under consideration into a set of input embeddings, also referred to herein as input vectors. The linguistic embedding mechanism 1104 can use different techniques to perform this task. In one approach, the linguistic embedding mechanism 1104 can convert each word in the web document into a vector representation, e.g., using a lookup table, neural network, etc. The linguistic embedding mechanism 1104 can also optionally add a special classification token "[cls]" to the beginning of the series of input embeddings.

Next, an adding mechanism 1106 adds position information to each input embedding. The position information describes the position of a token (associated with a particular input embedding) in the series of tokens that make up the web document. For example, assume that the web document includes the title "hybrid Ford hatchback 2020." The adding mechanism 1106 will add position information to the input embedding associated with "hybrid" that indicates that the word "hybrid" is the first token in the title. Overall, the topic detector 1102 adds position information to the input embeddings to inform its self-attention mechanisms (described below) of the positional context of each token under consideration within the web document. The adding mechanism 1106 can encode position information in different ways, such as by using one or more sinusoidal functions to map the index of a token into position information, or by using a machine-trained function to map the index of the token into position information. Overall, the adding mechanism 1106 produces position-modified embeddings.

A transformation mechanism 1108 next maps the set of position-modified embeddings into transformer output vectors. The transformation mechanism 1108, in turn, includes a chain of one or more transformation units, including representative transformation unit 1110 and one or more other transformation units 1112. The representative transformation unit 1110 includes a series of layers, including a self-attention mechanism 1114, an add-and-normalize mechanism 1116, a feed-forward neural network 1118, and another add-and-normalize mechanism 1120.

The self-attention mechanism 1114 determines the significance of each token in the web document to each other token. For example, assume that the given web document includes a set of linguistic tokens, optionally with a preceding classification token "[cls]". In processing each particular word in the web document, the self-attention mechanism 1114 takes into the consideration the relevance of each other word in the web document on that particular word. For example, assume that the web document incudes a sentence that reads: "What is the median sales price of this product in the city of Billings, Mont.?" In processing the word "Billings," the self-attention mechanism 1114 may determine that the tokens "city" and "MT" are most useful in correctly disambiguating the term "Billings," e.g., because these contextual terms strongly suggest that "Billings" refers to a physical place rather than a financial term.

The self-attention mechanism 1114 can determine the above-described cross-term relevance by packing the position-modified embeddings into a single matrix X. The self-attention mechanism 1114 then linearly projects this matrix X into three matrices Q, K, V, corresponding to a query matrix, key matrix, and value matrix, respectively, where $d_k$ is the dimension of the queries and keys in Q and K, respectively. A dot-product mechanism computes attention based on the equation:

$$\text{Attention}(Q, K, V) = \text{softmax}\left(\frac{QK^T}{\sqrt{d_k}}\right)V.$$

The add-and-normalize mechanism 1116 adds the input to the self-attention mechanism 1114 (i.e., the position-modified input embeddings) to the output result of the self-attention mechanism 1114, and then performs layer-normalization on that sum. The feed-forward network 1118 uses a fully-connected (FC) feed-forward neural network having any number of layers to transform the output of the add-and-normalize mechanism 1116 into an output result. In one implementation, the feed-forward network 1118 can use linear transformations interspersed with activations (e.g., ReLU activations). Finally, another add-and-normalize mechanism 1120 adds the input that is fed to feed-forward network 1118 to the output result of the feed-forward network 1118, and then normalizes that sum.

A classification mechanism 1122 operates on the output of the transformation unit 1110 to generate a probability score for each candidate topic within a set of possible candidate topics. Each probability score reflects the probability that the web document expresses a particular candidate topic. The classification mechanism can perform this task using a softmax layer, a neural network, a support vector machine (SVM), etc. The classification mechanism 1122 also determines whether each candidate topic has a score above an environment-specific threshold value. The classification mechanism 1122 concludes that the web document under consideration expresses a particular topic if its probability score is above the threshold value.

More specifically, in one implementation, the classification mechanism 1122 can operate on the transformed counterpart of the [CLS] token provided by the final layer of the transformation mechanism 1108. In another implementation, the classification mechanism 1122 can operate on the information imparted by the complete final layer of the transformation mechanism 1108.

A counter mechanism 1124 generates a data table 1126 that expresses the number of individual topics in a collection of web documents and the number of co-occurrences of particular topic pairings in the web documents. One implementation of the data table 1126 is shown in FIG. 6.

In one approach, the training system 114 (of FIG. 1) produces parameter values that determine the configuration of the topic detector 1102. The training system 114 generates these parameter values by iteratively operating on a corpus of training examples, each of which includes a candidate document and a set of tags. The tags for a candidate document describe the topics expressed by the candidate document. In one case, an extraction process can automatically extract tags from the web documents based on metadata (such as hashtags) that are already associated with the web documents, and/or keywords that are contained in the body of the web documents. Alternatively, or in addition, a human analyst can automatically apply the tags to the web documents, e.g., using a crowdsourcing platform or the like.

The training system 114 can train the machine-trained model 112 to maximize those cases in which the model 112 accurately predicts the topics of the training examples, and minimize those cases in which the model 112 does not accurately predict the topics of the training examples. The training system 114 can use any training technique to perform this task, such as Stochastic Gradient Descent. The training system 114 express its training objective as a cross-entropy loss function, or any other kind of loss function.

The topic detector 1102 shown in FIG. 11 can be varied in different ways. According to one variation, the linguistic embedding mechanism 1104 can integrate additional information regarding a web document under consideration. For example, the topic detector 1102 can incorporate information that describes the placement of each word in the document, e.g., by indicating whether the word originates from a title, abstract, document body, etc. Alternatively, or in addition, the linguistic embedding mechanism 1104 can incorporate visual information expressed by the web document that governs the appearance of words in the candidate document when the candidate document is presented by a browser application. Illustrative visual information can include HTML markup information that indicates the size used to present a word, the font used to present the word, the position of word in a document object model (DOM) tree, and so on. In one implementation, the linguistic embedding mechanism 1104 can concatenate any of the above-identified supplemental information for a word in a web document with its input embedding.

By taking into account the above-described supplemental information, the topic detector 1102 provides reliable classification results for different types of web documents. In particular, the web documents may vary because they originate from different domains. The web documents may also vary because they provide content having differing degrees of quality. For example, some web documents can provide more robust descriptions compared to other web documents.

As a trailing point, note that the topic detector 1102 shown in FIG. 11 can also be used by the topic-identifying mechanism 1006 of the application system 206 (of FIG. 10) in the real-time phase of operation, e.g., by determining a topic expressed by a user's input message.

In conclusion to Section A, the technique described herein provides a resource-efficient and scalable way of discovering latent information dispersed across web documents. The technique is efficient because its adopts a streamlined first stage that performs the limited task of determining topics expressed in web documents, without attempting to model the relationships among topics or attempting to account for the widely varying characteristics of different kinds of web documents. It includes an equally efficient second stage that applies conditional probability to the results of the first stage to identify the relationships among topics discovered in the first stage, e.g., without necessarily performing complex semantic analysis of the topics using machine learning. The efficiency of the technique also renders it scalable. The technique is specifically said to be scalable because it can be efficiently applied to a large number of web documents; this characteristic, in turn, is possible because the technique eliminates the need for a developer to develop and continually update a complex machine-trained model, and because it eliminates or reduces the need for a human analyst to manually evaluate web documents.

The above factors also allow the technique to consume computing resources (e.g., processing resources, memory resources, and communication resources, etc.) in an efficient manner. For example, since the first stage does not attempt to model the relationship among topics, it foregoes or reduces use of the computing resources that would otherwise be applied to this task.

B. Illustrative Processes

FIGS. 12-15 show processes that explain the operation of the computing environments (102, 202) of Section A in flowchart form. Since the principles underlying the operation of the computing environments (102, 202) have already been described in Section A, certain operations will be addressed in summary fashion in this section. As noted in the prefatory part of the Detailed Description, each flowchart is expressed as a series of operations performed in a particular order. But the order of these operations is merely representative, and can be varied in any manner.

FIGS. 12 and 13 together show one implementation of a process 1202 by which the computing environment 102 of FIG. 1 produces an application system. In block 1204, the computing environment 102 applies the machine-trained model 112 to a set of document units to produce topic information, each document unit including at least a portion of at least one web document that is accessible via a computer network 106. The document units can be associated with different domains and can have different layouts, informational qualities, etc. The operation of applying in block 1204 involves processing tokens included in each document unit to identify one or more topics that are expressed by each document unit, without regard to how the one or more topics are related to each other. In block 1206, the computing environment 102 generates count information based on the topic information by: for a set of candidate topics, counting a number of times each topic in the set of candidate topics occurs within the set of document units; and for a plurality of pairings of topics in the set of candidate topics, counting a number of times each pairing of topics occurs within the set of document units. In block 1208, the computing environment 102 stores the count information in a data table. In block 1210, the computing environment 102 generates conditional probability information based on the count information. An instance of conditional probability information describes a probability that a first topic will appear within a document unit, given an assumed appearance of a second topic in the document unit, and a probability that the second topic will appear within the document unit, given an assumed appearance of the first topic.

Advancing to FIG. 13, in block 1302, the computing environment 102 formulates the conditional probability information in a graph data structure. The graph data structure includes a plurality of nodes and a plurality of edges, the plurality of nodes representing the topics in the set of candidate topics, and each edge that connects two nodes expressing a hierarchical relationship between two topics respectively associated with the two nodes. In block 1304, the computing environment 102 provides an application system that uses the graph data structure to provide a computer-implemented service to a user.

FIG. 14 shows a process 1402 by which the computing environment 202 of FIG. 2 applies an application system 206 produced via the process 1202 of FIGS. 12 and 13. In block 1404, the computing environment 202 receives an input message submitted by a user via a computer network 208. In block 1406, the computing environment 202 generates a response to the input message using the application system 206 provided by hardware logic circuitry. The application system 206 generates the response by leveraging the conditional probability information produced by a process 1202 of FIGS. 12 and 13.

FIG. 15 shows further details regarding operations within the process 1202 of FIGS. 12 and 13. In block 1502, which is part of the operation of block 1210 of FIG. 12, the computing environment 102 divides a number of times that the first topic and the second topic co-occur within the document units by a number of times that the second topic occurs within the document units, to produce a first conditional probability score. It also divides the number of times that the first topic and the second topic co-occur within the document units by a number of times that the first topic occurs within the document units, to produce a second conditional probability score. Blocks 1504-1508 are part of the operation of the formulating in block 1302 of FIG. 13. In block 1504, the computing environment 102 compares each of the first conditional probability score and the second conditional probability score to a prescribed threshold value to produce a comparison result. In block 1506, the computing environment 102 establishes a link between the first topic and the second topic based on the comparison result, the link indicating that the second topic is a child of the first topic or the first topic is a child of the second topic. In block 1508, the computing environment 102 represents the link as an edge in a graph data structure.

C. Representative Computing Functionality

Figure 16:
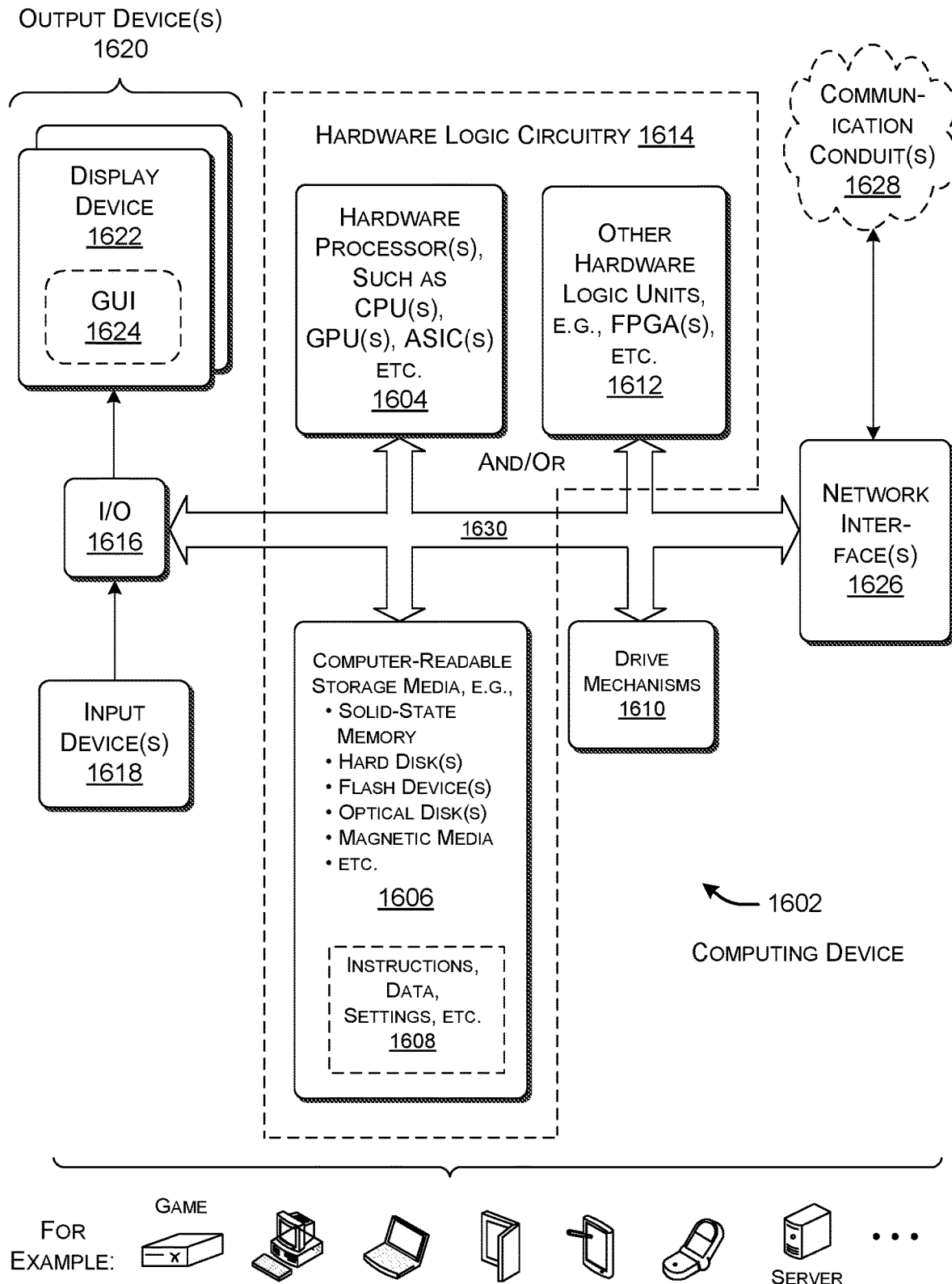
FIG. 16 shows an illustrative type of computing device that can be used to implement any aspect of the features shown in the foregoing drawings.

FIG. 16 shows a computing device 1602 that can be used to implement any aspect of the mechanisms set forth in the above-described figures. For instance, with reference to FIGS. 1 and 2, the type of computing device 1602 shown in FIG. 16 can be used to implement any user computing device or any server. In all cases, the computing device 1602 represents a physical and tangible processing mechanism.

The computing device 1602 can include one or more hardware processors 1604. The hardware processor(s) 1604 can include, without limitation, one or more Central Processing Units (CPUs), and/or one or more Graphics Processing Units (GPUs), and/or one or more Application Specific Integrated Circuits (ASICs), etc. More generally, any hardware processor can correspond to a general-purpose processing unit or an application-specific processor unit.

The computing device 1602 can also include computer-readable storage media 1606, corresponding to one or more computer-readable media hardware units. The computer-readable storage media 1606 retains any kind of information 1608, such as machine-readable instructions, settings, data, etc. Without limitation, for instance, the computer-readable storage media 1606 may include one or more solid-state devices, one or more magnetic hard disks, one or more optical disks, magnetic tape, and so on. Any instance of the computer-readable storage media 1606 can use any technology for storing and retrieving information. Further, any instance of the computer-readable storage media 1606 may represent a fixed or removable unit of the computing device 1602. Further, any instance of the computer-readable storage media 1606 may provide volatile or non-volatile retention of information.

The computing device 1602 can utilize any instance of the computer-readable storage media 1606 in different ways. For example, any instance of the computer-readable storage media 1606 may represent a hardware memory unit (such as Random Access Memory (RAM)) for storing transient information during execution of a program by the computing device 1602, and/or a hardware storage unit (such as a hard disk) for retaining/archiving information on a more permanent basis. In the latter case, the computing device 1602 also includes one or more drive mechanisms 1610 (such as a hard drive mechanism) for storing and retrieving information from an instance of the computer-readable storage media 1606.

The computing device 1602 may perform any of the functions described above when the hardware processor(s) 1604 carry out computer-readable instructions stored in any instance of the computer-readable storage media 1606. For instance, the computing device 1602 may carry out computer-readable instructions to perform each block of the processes described in Section B.

Alternatively, or in addition, the computing device 1602 may rely on one or more other hardware logic units 1612 to perform operations using a task-specific collection of logic gates. For instance, the hardware logic unit(s) 1612 may include a fixed configuration of hardware logic gates, e.g., that are created and set at the time of manufacture, and thereafter unalterable. Alternatively, or in addition, the other hardware logic unit(s) 1612 may include a collection of programmable hardware logic gates that can be set to perform different application-specific tasks. The latter category of devices includes, but is not limited to Programmable Array Logic Devices (PALs), Generic Array Logic Devices (GALs), Complex Programmable Logic Devices (CPLDs), Field-Programmable Gate Arrays (FPGAs), etc.

FIG. 16 generally indicates that hardware logic circuitry 1614 includes any combination of the hardware processor(s) 1604, the computer-readable storage media 1606, and/or the other hardware logic unit(s) 1612. That is, the computing device 1602 can employ any combination of the hardware processor(s) 1604 that execute machine-readable instructions provided in the computer-readable storage media 1606, and/or one or more other hardware logic unit(s) 1612 that perform operations using a fixed and/or programmable collection of hardware logic gates. More generally stated, the hardware logic circuitry 1614 corresponds to one or more hardware logic units of any type(s) that perform operations based on logic stored in and/or otherwise embodied in the hardware logic unit(s).

In some cases (e.g., in the case in which the computing device 1602 represents a user computing device), the computing device 1602 also includes an input/output interface 1616 for receiving various inputs (via input devices 1618), and for providing various outputs (via output devices 1620). Illustrative input devices include a keyboard device, a mouse input device, a touchscreen input device, a digitizing pad, one or more static image cameras, one or more video cameras, one or more depth camera systems, one or more microphones, a voice recognition mechanism, any movement detection mechanisms (e.g., accelerometers, gyroscopes, etc.), and so on. One particular output mechanism may include a display device 1622 and an associated graphical user interface presentation (GUI) 1624. The display device 1622 may correspond to a liquid crystal display device, a light-emitting diode display (LED) device, a cathode ray tube device, a projection mechanism, etc. Other output devices include a printer, one or more speakers, a haptic output mechanism, an archival mechanism (for storing output information), and so on. The computing device 1602 can also include one or more network interfaces 1626 for exchanging data with other devices via one or more communication conduits 1628. One or more communication buses 1630 communicatively couple the above-described units together.

The communication conduit(s) 1628 can be implemented in any manner, e.g., by a local area computer network, a wide area computer network (e.g., the Internet), point-to-point connections, etc., or any combination thereof. The communication conduit(s) 1628 can include any combination of hardwired links, wireless links, routers, gateway functionality, name servers, etc., governed by any protocol or combination of protocols.

FIG. 16 shows the computing device 1602 as being composed of a discrete collection of separate units. In some cases, the collection of units may correspond to discrete hardware units provided in a computing device chassis having any form factor. FIG. 16 shows illustrative form factors in its bottom portion. In other cases, the computing device 1602 can include a hardware logic unit that integrates the functions of two or more of the units shown in FIG. 1. For instance, the computing device 1602 can include a system on a chip (SoC or SOC), corresponding to an integrated circuit that combines the functions of two or more of the units shown in FIG. 16.

The following summary provides a non-exhaustive set of illustrative examples of the technology set forth herein.

According to a first example, a computer-implemented method for processing web documents is described. The method incudes applying a machine-trained model to a set of document units to produce topic information, each document unit including at least a portion of at least one web document that is accessible via a wide area network, the document units corresponding to different domains. The applying operation involves processing tokens included in each document unit to identify one or more topics that are expressed by each document unit, without regard to how the one or more topics are related to each other. The method further includes generating count information based on the topic information by: for a set of candidate topics, counting a number of times each topic in the set of candidate topics occurs within the set of document units; and for a plurality of pairings of topics in the set of candidate topics, counting a number of times each pairing of topics occurs within the set of document units. The method then stores the count information in a data table. The method then includes generating conditional probability information based on the count information, an instance of conditional probability information describing a probability that a first topic will appear within a given document unit, given an assumed appearance of a second topic in the given document unit, and a probability that the second topic will appear within the given document unit, given an assumed appearance of the first topic. The method then includes formulating the conditional probability information in a graph data structure, the graph data structure including a plurality of nodes and a plurality of edges, the plurality of nodes representing the topics in the set of candidate topics, and each edge that connects two nodes expressing a hierarchical relationship between two topics respectively associated with the two nodes. The method finally includes providing an application system that is configured to use the graph data structure to provide a computer-implemented service to a user.

According to a second example, at least one document unit in the set of document units corresponds to a single web document.

According to a third example, at least one document unit in the set of document units includes at least two web documents, a first web document in the at least two web documents having a link to another web document in the at least two web documents.

According to a fourth example, the operation of generating the conditional probability information generates the instance of conditional probability information by: dividing a number of times that the first topic and the second topic co-occur within the document units by a number of times that the second topic occurs within the document units, to produce a first conditional probability score; and dividing the number of times that the first topic and the second topic co-occur within the document units by a number of times that the first topic occurs within the document units, to produce a second conditional probability score.

According to a fifth example, relating to the fourth example, the operation of formulating includes comparing each of the first conditional probability score and the second conditional probability score to a prescribed threshold value to produce a comparison result, and determining that a relationship exists based on the comparison result.

According to a sixth example, relating to the fifth example, when the comparison result indicates that the first conditional probability score or the second probability score is above the prescribed threshold value, but both the first probability score and the second probability score are not above the prescribed threshold value, the relationship indicates that the second topic has a child relationship with respect to the first topic, or the first topic has a child relationship with respect to the second topic.

According to a seventh example, the application system uses the conditional probability information to interpret an input message provided by the user.

According to an eighth example, relating to the seventh example, the application system is configured to: interpret the input message by identifying at least one topic associated with the input message; and interrogate the graph data structure to find at least one topic that is related to the input message.

According to ninth example, one or more computing devices for processing an input message submitted by a user are described. The computing device(s) include hardware logic circuitry, the hardware logic circuitry including: (a) one or more hardware processors that perform operations by executing machine-readable instructions stored in a memory, and/or (b) one or more other hardware logic units that perform the operations using a task-specific collection of logic gates. The operations include: receiving the input message submitted by the user via a computer network; and generating a response to the input message using an application system provided by the hardware logic circuitry. The application system generates the response by leveraging conditional probability information produced by a process that involves applying a machine-trained model to a set of document units to produce topic information, each document unit including at least a portion of at least one web document that is accessible via a wide area network, the document units corresponding to different domains. The operation of applying involves processing tokens included in each document unit to identify one or more topics that are expressed by each document unit, without regard to how the one or more topics are related to each other. The process also involves generating count information based on the topic information by: for a set of candidate topics, counting a number of times each topic in the set of candidate topics occurs within the set of document units; and for a plurality of pairings of topics in the set of candidate topics, counting a number of times each pairing of topics occurs within the set of document units. The process then stores the count information in a data table. The process also involves generating the conditional probability information based on the count information, an instance of conditional probability information describing a probability that a first topic will appear within a given document unit, given an assumed appearance of a second topic in the given document unit, and a probability that the second topic will appear within the given document unit, given an assumed appearance of the first topic. The process also involves formulating the conditional probability information in a graph data structure, the graph data structure including a plurality of nodes and a plurality of edges, the plurality of nodes representing the topics in the set of candidate topics, and each edge that connects two nodes expressing a hierarchical relationship between two topics respectively associated with the two nodes.

According to a tenth example, relating to the ninth example, the operation of generating the conditional probability information generates the instance of conditional probability information by: dividing a number of times that the first topic and the second topic co-occur within the document units by a number of times that the second topic occurs within the document units, to produce a first conditional probability score; and dividing the number of times that the first topic and the second topic co-occur within the document units by a number of times that the first topic occurs within the document units, to produce a second conditional probability score.

According to an eleventh example, relating to the tenth example, the operation of formulating includes comparing each of the first conditional probability score and the second conditional probability score to a prescribed threshold value to produce a comparison result, and determining that a relationship exists based on the comparison result.

According to a twelfth example, relating to the ninth example, the application system is configured to use the conditional probability information to interpret the input message.

According to a thirteenth example, relating to the twelfth example, the application system is configured to interpret the input message by identifying at least one topic associated with the input message, and interrogating the graph data structure to find at least one topic that is related to the input message.

According to a fourteenth example, relating to the ninth example, the application system includes a response-formulating mechanism that incorporates information imparted by the graph data structure, and wherein the response-formulating mechanism is configured to interpret the input message based on the information imparted by the graph data structure.

According to a fifteenth example, relating to the ninth example, the application system uses the conditional probability information, in part, as weighting factors in a process of ranking web documents using a random walk algorithm.

According to a sixteenth example, relating to the ninth example, the application system is configured to use the conditional probability information, in part, to modify an existing knowledge graph by adding at least one node and/or at least one edge to the existing knowledge graph.

According to a seventeenth example, relating to the ninth example, the application system is configured to use the conditional probability information, in part, to find at least one item that matches an input query submitted by a user and/or a current context that affects the user.

According to an eighteenth example, relating to the ninth example, the application system is configured to use the conditional probability information, in part, to store a document at an identified location in a data store.

According to a nineteenth example, a computer-readable storage medium for storing computer-readable instructions is described. The computer-readable instructions, when executed by one or more hardware processors, perform a method that includes applying a machine-trained model to a set of document units to produce topic information, each document unit including at least a portion of at least one web document that is accessible via a wide area network, the document units corresponding to different domains. The operation of applying involves processing tokens included in each document unit to identify one or more topics that are expressed by each document unit, without regard to how the one or more topics are related to each other. The method also includes generating count information based on the topic information by: for a set of candidate topics, counting a number of times each topic in the set of candidate topics occurs within the set of document units; and for a plurality of pairings of topics in the set of candidate topics, counting a number of times each pairing of topics occurs within the set of document units. The method then stores the count information in a data table. The method also includes generating conditional probability information based on the count information, an instance of conditional probability information describing a probability that a first topic will appear within a given document unit, given an assumed appearance of a second topic in the given document unit, and a probability that the second topic will appear within the given document unit, given an assumed appearance of the first topic. More specifically, the instance of conditional probability is produced by: dividing a number of times that the first topic and the second topic co-occur within the document units by a number of times that the second topic occurs within the document units, to produce a first conditional probability score; and dividing the number of times that the first topic and the second topic co-occur within the document units by a number of times that the first topic occurs within the document units, to produce a second conditional probability score. The method also includes formulating the conditional probability information in a graph data structure. The operation of formulating involves: comparing each of the first conditional probability score and the second conditional probability score to a prescribed threshold value to produce a comparison result; establishing a link between the first topic and the second topic based on the comparison result, the link indicating that the second topic is a child of the first topic or the first topic is a child of the second topic; and representing the link as an edge in the graph data structure.

According to a twentieth example, relating to the nineteenth example, the operation of establishing the link establishes the link when one of the first probability score and the second probability score is above a prescribed threshold value, and another of the first probability score and the second probability score is below the prescribed threshold value.

A twenty-first example corresponds to any combination (e.g., any logically consistent permutation or subset) of the above-referenced first through twentieth examples.

A twenty-second example corresponds to any method counterpart, device counterpart, system counterpart, means-plus-function counterpart, computer-readable storage medium counterpart, data structure counterpart, article of manufacture counterpart, graphical user interface presentation counterpart, etc. associated with the first through twenty-first examples.

In closing, the functionality described herein can employ various mechanisms to ensure that any user data is handled in a manner that conforms to applicable laws, social norms, and the expectations and preferences of individual users. For example, the functionality can allow a user to expressly opt in to (and then expressly opt out of) the provisions of the functionality. The functionality can also provide suitable security mechanisms to ensure the privacy of the user data (such as data-sanitizing mechanisms, encryption mechanisms, password-protection mechanisms, etc.).

Further, the description may have set forth various concepts in the context of illustrative challenges or problems. This manner of explanation is not intended to suggest that others have appreciated and/or articulated the challenges or problems in the manner specified herein. Further, this manner of explanation is not intended to suggest that the subject matter recited in the claims is limited to solving the identified challenges or problems; that is, the subject matter in the claims may be applied in the context of challenges or problems other than those described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for processing web documents, comprising:
applying a machine-trained model to a set of document units to produce topic information, each document unit including at least a portion of at least one web document that is accessible via a wide area network, the document units corresponding to different domains,
said applying involving processing tokens included in each document unit to identify one or more topics that are expressed by each document unit, without regard to how said one or more topics are related to each other;
generating count information based on the topic information by:
for a set of candidate topics, counting a number of times each topic in the set of candidate topics occurs within the set of document units; and
for a plurality of pairings of topics in the set of candidate topics, counting a number of times each pairing of topics occurs within the set of document units;
storing the count information in a data table;
generating conditional probability information based on the count information, an instance of conditional probability information describing a probability that a first topic will appear within a given document unit, given an assumed appearance of a second topic in the given document unit, and a probability that the second topic will appear within the given document unit, given an assumed appearance of the first topic;
formulating the conditional probability information in a graph data structure, the graph data structure including a plurality of nodes and a plurality of edges, the plurality of nodes representing the topics in the set of candidate topics, and each edge that connects two nodes expressing a hierarchical relationship between two topics respectively associated with the two nodes; and
providing an application system that is configured to use the graph data structure to provide a computer-implemented service to a user,
wherein said generating the conditional probability information generates the instance of conditional probability information by:
dividing a number of times that the first topic and the second topic co-occur within the document units by a number of times that the second topic occurs within the document units, to produce a first conditional probability score; and
dividing the number of times that the first topic and the second topic co-occur within the document units by a number of times that the first topic occurs within the document units, to produce a second conditional probability score,
wherein said formulating includes, based on a determination that the first conditional probability score or the second conditional probability score is above a prescribed threshold value, and the first conditional probability score and the second conditional probability score are not both above the prescribed threshold value, and the first conditional probability score and the second conditional probability score are not both below the prescribed threshold value, determining that the second topic has a child relationship with respect to the first topic, or the first topic has a child relationship with respect to the second topic,
wherein a co-occurrence of the first topic and the second topic within the document units, on basis of which the instance of conditional probability information is generated, is weighted by a weighting factor that depends on a document scope in which the first topic and the second topic occur together.

2. The computer-implemented method of claim 1, wherein at least one document unit in the set of document units corresponds to a single web document.

3. The computer-implemented method of claim 1, wherein at least one document unit in the set of document units includes at least two web documents, a first web document in said at least two web documents having a link to another web document in said at least two web documents.

4. The computer-implemented method of claim 1, wherein the application system uses the conditional probability information to interpret an input message provided by the user.

5. The computer-implemented method of claim 4, wherein the application system is configured to:
interpret the input message by identifying at least one topic associated with the input message; and
interrogate the graph data structure to find at least one topic that is related to the input message.

6. The computer-implemented method of claim 1, wherein a given topic is weighted by a weighting factor that depends on a kind of informational content imparted by a document unit in which the given topic is expressed.

7. The computer-implemented method of claim 1, wherein a particular document unit includes a first web document that expresses the first topic and a second web document that expresses the second topic, wherein there is a link between the first web document and the second web document that indicates that the first web document links to the second web document or the second web document links to the first web document, and wherein the computer-implemented method includes boosting a strength of the link between the first web document and the second web document based on the instance of conditional probability information.

8. One or more computing devices for processing an input message submitted by a user, comprising:
hardware logic circuitry, the hardware logic circuitry including: (a) one or more hardware processors that perform operations by executing machine-readable instructions stored in a memory, or (b) one or more other hardware logic units that perform the operations using a task-specific collection of logic gates, or (a) and (b), the operations including:
receiving the input message submitted by the user via a computer network;
generating a response to the input message using an application system provided by the hardware logic circuitry,
the application system generating the response by leveraging conditional probability information produced by a process that involves:
applying a machine-trained model to a set of document units to produce topic information, each document unit including at least a portion of at least one web document that is accessible via a wide area network, the document units corresponding to different domains, said applying involving processing tokens included in each document unit to identify one or more topics that are expressed by each document unit, without regard to how said one or more topics are related to each other;

generating count information based on the topic information by:

for a set of candidate topics, counting a number of times each topic in the set of candidate topics occurs within the set of document units; and for a plurality of pairings of topics in the set of candidate topics, counting a number of times each pairing of topics occurs within the set of document units;

storing the count information in a data table;

generating the conditional probability information based on the count information, an instance of conditional probability information describing a probability that a first topic will appear within a given document unit, given an assumed appearance of a second topic in the given document unit, and a probability that the second topic will appear within the given document unit, given an assumed appearance of the first topic; and formulating the conditional probability information in a graph data structure, the graph data structure including a plurality of nodes and a plurality of edges, the plurality of nodes representing the topics in the set of candidate topics, and each edge that connects two nodes expressing a hierarchical relationship between two topics respectively associated with the two nodes, wherein said generating the conditional probability information generates the instance of conditional probability information by:

dividing a number of times that the first topic and the second topic co-occur within the document units by a number of times that the second topic occurs within the document units, to produce a first conditional probability score; and dividing the number of times that the first topic and the second topic co-occur within the document units by a number of times that the first topic occurs within the document units, to produce a second conditional probability score, wherein said formulating includes, based on a determination that the first conditional probability score or the second conditional probability score is above a prescribed threshold value, and the first conditional probability score and the second conditional probability score are not both above the prescribed threshold value, and the first conditional probability score and the second conditional probability score are not both below the prescribed threshold value, determining that the second topic has a child relationship with respect to the first topic, or the first topic has a child relationship with respect to the second topic, wherein a co-occurrence of the first topic and the second topic within the document units, on basis of which the instance of conditional probability information is generated, is weighted by a weighting factor that depends on a document scope in which the first topic and the second topic occur together.

9. The one or more computing devices of claim 8, wherein the application system is configured to use the conditional probability information to interpret the input message.

10. The one or more computing devices of claim 9, wherein the application system is configured to interpret the input message by identifying at least one topic associated with the input message, and interrogating the graph data structure to find at least one topic that is related to the input message.

11. The one or more computing devices of claim 8, wherein the application system includes a response-formulating mechanism that incorporates information imparted by the graph data structure, and wherein the response-formulating mechanism is configured to interpret the input message based on the information imparted by the graph data structure.

12. The one or more computing devices of claim 8, wherein the application system uses the conditional probability information, in part, as weighting factors in a process of ranking web documents using a random walk algorithm.

13. The one or more computing devices of claim 8, wherein the application system is configured to use the conditional probability information, in part, to modify an existing knowledge graph by adding at least one node to the existing knowledge graph, or at least one edge to the existing knowledge graph, or said at least one node and said at least one edge to the existing knowledge graph.

14. The one or more computing devices of claim 8, wherein the application system is configured to use the conditional probability information, in part, to find at least one item that matches an input query submitted by a user, or a current context that affects the user, or the input query and the current context.

15. The one or more computing devices of claim 8, wherein the application system is configured to use the conditional probability information, in part, to store a document at an identified location in a data store.

16. A computer-readable storage medium for storing computer-readable instructions, the computer-readable instructions, when executed by one or more hardware processors, performing a method that comprises:

applying a machine-trained model to a set of document units to produce topic information, each document unit including at least a portion of at least one web document that is accessible via a wide area network, the document units corresponding to different domains, said applying involving processing tokens included in each document unit to identify one or more topics that are expressed by each document unit, without regard to how said one or more topics are related to each other;

generating count information based on the topic information by:

for a set of candidate topics, counting a number of times each topic in the set of candidate topics occurs within the set of document units; and for a plurality of pairings of topics in the set of candidate topics, counting a number of times each pairing of topics occurs within the set of document units;

storing the count information in a data table; and generating conditional probability information based on the count information, an instance of conditional probability information describing a probability that a first topic will appear within a given document unit, given an assumed appearance of a second topic in the given document unit, and a probability that the second topic will appear within the given document unit, given an assumed appearance of the first topic, the instance of conditional probability information being produced by:

dividing a number of times that the first topic and the second topic co-occur within the document units by a number of times that the second topic occurs within the document units, to produce a first conditional probability score; and
dividing the number of times that the first topic and the second topic co-occur within the document units by a number of times that the first topic occurs within the document units, to produce a second conditional probability score; and
formulating the conditional probability information in a graph data structure, involving:
comparing each of the first conditional probability score and the second conditional probability score to a prescribed threshold value to produce a comparison result;
establishing a link between the first topic and the second topic based on the comparison result, the link indicating that the second topic is a child of the first topic or the first topic is a child of the second topic; and
representing the link as an edge in the graph data structure,
wherein said establishing the link establishes the link based on a determination that one of the first conditional probability score and the second conditional probability score is above a prescribed threshold value, and based on a determination that the first conditional probability score and the second conditional probability score are not both above the prescribed threshold value, and the first conditional probability score and the second conditional probability score are not both below the prescribed threshold value,
wherein a co-occurrence of the first topic and the second topic within the document units, on basis of which the instance of conditional probability information is generated, is weighted by a weighting factor that depends on a document scope in which the first topic and the second topic occur together.

* * * * *